United States Patent [19]
Wadsworth et al.

[11] Patent Number: 5,683,794
[45] Date of Patent: Nov. 4, 1997

[54] FIBROUS WEB HAVING CELLULOSIC FIBERS

[75] Inventors: Larry C. Wadsworth; Kermit E. Duckett, both of Knoxville, Tenn.; Venkataramanan Balasubramanian, Albemarle, N.C.

[73] Assignee: The University of Tennessee Research Center, Knoxville, Tenn.

[21] Appl. No.: 705,066

[22] Filed: Aug. 29, 1996

Related U.S. Application Data

[63] Continuation of Ser. No. 481,201, Jun. 6, 1995, abandoned, which is a continuation of Ser. No. 81,431, Jun. 21, 1993, abandoned, which is a continuation of Ser. No. 842,888, Feb. 26, 1992, abandoned.

[51] Int. Cl.⁶ .................. D04H 1/04; B32B 5/22
[52] U.S. Cl. .................. 428/284; 428/296; 428/298
[58] Field of Search .................. 428/284, 296, 428/298, 903

[56] References Cited

U.S. PATENT DOCUMENTS

| | | | |
|---|---|---|---|
| 4,950,531 | 8/1990 | Radwanski et al. | 428/284 |
| 4,970,104 | 11/1990 | Radwanski et al. | 428/284 |

FOREIGN PATENT DOCUMENTS

| | | |
|---|---|---|
| 0006647 | 1/1980 | European Pat. Off. . |
| 1432978 | 4/1976 | United Kingdom . |
| 1589181 | 3/1978 | United Kingdom . |

OTHER PUBLICATIONS

Valmet Paper Machinery, Honeycomb Hydroentanglement For Soft, Strong, Nonwovens, pp. 1–6.
Wadsworth, L.C. et al, Proceedings of Fiber Producer Conference 1983, *Handbook of Fiber Science and Technology*, vol. 2, pp. 172–183 (1983).

*Primary Examiner*—Thurman K. Page
*Assistant Examiner*—Kathryne E. Shelborne
*Attorney, Agent, or Firm*—Weiser & Associates, P.C.

[57] ABSTRACT

A multilayered nonwoven composite web particularly useful as a substitute for a woven web such as a textile web, and having improved liquid wicking and retention properties comprising a first layer of fibrous material selected from the group consisting of thermoplastic meltblown man-made fibers, thermoplastic spunbonded man-made fibers, thermoplastic man-made staple fibers and combinations thereof, this first layer being light weight, and a second layer of cellulosic-based fibers, preferably cotton fibers, the first and second layers being thermally bonded together over about 5 to 75% of the surface area of the web to form a coherent web having an air permeability of between about 25 and about 37 ft³/min/ft² (0.127 and 0.188 m³/sec/m²). In a preferred embodiment, the composite web includes at least a third layer of thermoplastic man-made fibers and the layer of cellulose-based fibers is sandwiched between the two layers of thermoplastic man-made fibers.

50 Claims, 33 Drawing Sheets

FIBROUS WEB HAVING CELLULOSIC FIBERS

This application is a continuation of application Ser. No. 08/481,201 filed Jun. 6, 1995, now abandoned, which is a continuation of now abandoned application Ser. No. 08/081,431, filed Jun. 21, 1993, now abandoned which is a continuation of application Ser. No. 07/842,888, filed Feb. 26, 1992, now abandoned.

BACKGROUND OF THE INVENTION

This invention relates to fibrous webs and particularly to novel composite webs comprising one or more layers of a thermo-plastic nonwoven web in combination with a layer of cellulosic-based fibers.

Nonwoven webs (fabrics) are defined as "sheet or web structures made by bonding and/or interlocking fibers, yarns or filaments by mechanical, thermal, chemical or solvent means." These webs do not require the conversion of fibers to yarn. Nonwoven webs are also called bonded or engineered webs and are manufactured by processes other than spinning, weaving or knitting, hence the name "nonwovens". The basic structure of all nonwovens is a web of fibers or filaments. A single type of fiber or filament may be the basic element of a nonwoven. Fibers that are measured in centimeters or inches or fractions thereof are called staple fibers. Those fibers of extreme length are called filament fibers. In general filament fibers are measured in terms of kilometers or miles. In fact, filament fibers are not readily measured, as they may be many, many yards in length. In fibers the length must be considerably greater than the diameter, e.g., a length-to-width (diameter) ratio of at least 100 and usually considerably higher. Cotton fibers may measure from less than ½ inch (0.27 cm) to more than 2 inches (5.08 cm) in length and have a typical length-to-diameter ratio of about 1400. Other natural fibers exhibit typical ratios as follows: flax—1200; ramie—3000; and wool—3000. In the present application, the terms "fiber" or "fibers" are intended to include both short and long fibers, i.e. staple fibers and filament fibers, unless otherwise specifically indicated by identifying the fibers as staple or filament. For example, spunbonded webs are formed of filament fibers, whereas meltblown webs include an assortment of fiber lengths so that these webs commonly include both staple length and filament length fibers. In nonwovens, the individual fibers may be in an organized or in a random arrangement. Tensile, elongation, and hand properties are imparted to the web by the type or types of bonding as well as fiber-to-fiber cohesion and reinforcement by its constituents. The technology for making nonwoven webs is based on the following primary elements: fibers of various lengths and diameters; a web arranged according to the method of forming and processing; the bonding of fibers within the web and reinforcement by its constituents. The variation of one or several elements in combination allows for the enormous range of nonwoven fiber types. Control of the type and length of the fibers and of the bonding, in combination with the selection of the manufacturing method, gives rise to a highly technical, yet extremely flexible combination of options.

Nonwoven webs have heretofore found acceptance in the medical industry as disposable substitutes for the prior art reusable cotton examination gowns, surgical gowns, surgical drapes, face masks, shoe covers, sterilization wrap and other products, to the extent that this market for nonwoven products is estimated to exceed one billion dollars annually.

Further, nonwoven webs have found use in sanitary products, such as sanitary napkins, disposable diapers, incontinent pads and other similar products. One of the benefits of nonwoven webs heretofore has been their relatively low cost, as compared to woven webs. The difference in cost between nonwoven and woven webs has heretofore been of a magnitude such that the end users can dispose of the nonwoven web product after a single use and yet realize a monetary gain over the multi-use woven webs.

Among the desired properties of a nonwoven web for use in medical and sanitary applications are the hand (softness and drapability), wicking, liquid retention, absorptive capacity and strength of the web. Also of importance in acceptance of the nonwoven web by the end user is the degree to which the nonwoven web approximates the desirable properties of the woven webs, in particularly cotton webs. Nonwoven webs generally have the reputation of notoriously lacking many of the properties of woven webs, in particular hand, wicking, and liquid absorption and retention. Meltblown nonwoven webs, for example, exhibit a void volume of about 85%; spunbonded nonwoven webs exhibit a void volume of between about 90 and 95%. These webs, further, often exhibit undesirable chemical properties, such as hydrophobicity, that make the webs less than desirable for use in medical applications, for example. Moreover, the surface properties of these nonwoven webs tend to be smooth, hence exhibit a slick or oily feel and appearance. The fibrous material of the prior art nonwoven webs most commonly exhibits a low surface tension so that aqueous liquids are not attracted thereto so that these prior art webs have poor wicking and retention of these liquids. These webs also are difficult to treat with liquid repellents. Still further, the filamentary nature of the fibers of many prior art webs and their methods of manufacture cause the fibers to lay in the webs with the length dimension of the fibers oriented substantially parallel to the plane of the web so that the webs have poor absorbency of liquids into the body of the web. Considerable effort has been exerted heretofore to improve these properties of nonwoven webs, including modification of the manner of manufacturing and/or processing the web. These efforts, however, increase the cost of the nonwoven web and may adversely alter its monetary advantage over woven webs. Further, the fibers of nonwoven webs most commonly are petroleum-based and therefore have been subject to the substantial fluctuations in market price of this raw material, and the important considerations in ultimate disposal of the product after use.

In accordance with the present invention there is provided a novel multilayered composite web; all of the layers of which are nonwoven, and which exhibits the desirable properties of a woven web and the economic advantages of a nonwoven web. The web of the present invention is multilayered and comprises a first layer of man-made fibrous material selected from the group consisting of thermoplastic meltblown man-made fibers, thermoplastic spunbonded man-made fibers, thermoplastic man-made staple fibers, and combinations thereof, this first layer being light weight and having a weight of between about 0.05 and about 10 oz/yd$^2$(1.7 and 340 g/m$^2$), and a second layer of cellulose-based staple fibers, excluding wood fibers, and having a weight of between about 0.1 and about 10 oz/yd$^2$(3.4 and 340 g/m$^2$), the fibers of the second layer having a fiber length of between about 0.5 and about 3.0 inches (1.27 and 7.62 cm) and a fineness of equivalent to between about 3 and 5 Micronaire units. The layers are preferably thermally bonded together to form a coherent web, the area of bonding between the layers being between about 5 and about 75% of the area of one of the flat surfaces of the composite web. The bonding contemplated in the present invention is of a type which does not adversely affect the hand and other physical characteristics of the web such as liquid wicking and retention rates. Accordingly, the preferred bonding is effected from only one side of the laminate.

In a preferred embodiment, the composite web includes at least a third layer of fibrous material selected from the group consisting of thermoplastic meltblown man-made fibers, thermoplastic spunbonded man-made fibers, thermoplastic man-made staple fibers and combinations thereof. This third layer preferably also is light weight and has a weight of between about 0.05 and about 10 oz/yd$^2$(1.7 and 340 g/m$^2$), and is disposed on that side of the second layer opposite the first layer and thermally bonded to at least the second layer such that the second layer is sandwiched between the first and third layers. Other and additional like layers of like materials may be included in the composite.

The composite web product of the present invention, regardless of the number of layers employed in its makeup, preferably exhibits a final composite weight of between about 0.5 and about 24 oz/yd$^2$ (1.7 and 814 g/m$^2$) in order to approximate a woven web in feel, drapability and other properties. This limitation upon the present web requires that there be careful selection of the weight of each of the individual layers of the composite web which will provide other desirable or required properties such as strength, wicking, liquid absorption and retention, and barrier properties (ability to exclude liquids while permitting or even encouraging vapor and gas transfer through the thickness of the web).

The composite web of the present invention is particularly useful in the manufacture of disposable medical products because of its superior barrier properties, hand, breathability, strength, wicking and liquid absorption and retention, among other properties.

BRIEF DESCRIPTION OF THE FIGURES

With reference to the Figures.

DETAILED DESCRIPTION OF THE INVENTION

Figure 2:
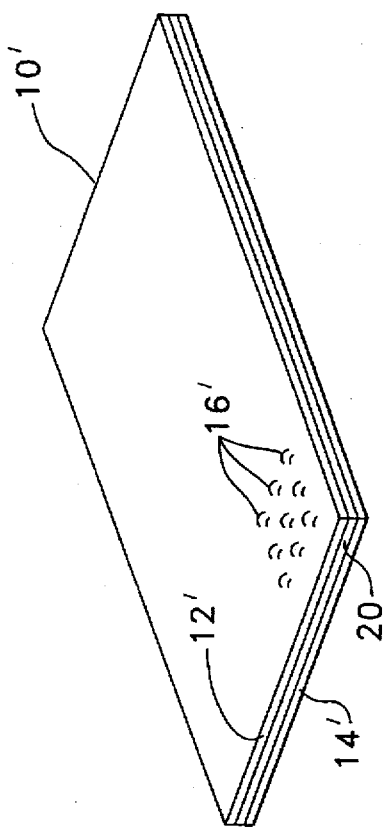
FIG. 2 is a schematic representation of another embodiment of a web which incorporates various of the features of the present invention.
Figure 1:
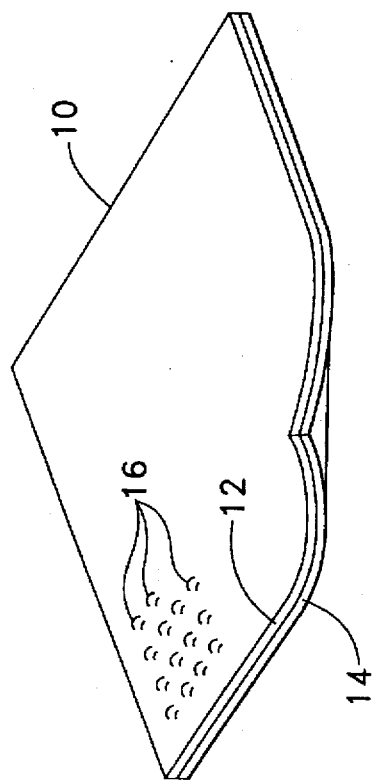
FIG. 1 is a schematic representation of one embodiment of a web which incorporates various of the features of the present invention.

With reference to FIG. 1, the depicted composite web 10 comprises a first layer 12, and a second layer 14. As depicted, these layers are bonded one to the other as by a pattern of diamond-shaped bonds 16 that are each of substantially the same size and spaced apart from one another. These bond areas preferably extend over substantially the entire area of the composite web and thereby serving to integrate the layers into a coherent web. In FIG. 2 there is depicted a further web 10 which includes like first and second layers, 12' and 14' respectively, plus a third layer 20.

At least one of the layers of the composite web of the present invention is of thermoplastic man-made fibers. Accordingly, bonding of the layers of the web one to another may be accomplished by any of several well known thermal bonding means, such as passing the overlaid layers through a set of heated rolls. Preferably, at least one of these rolls is provided with a surface pattern of projections 30 (see FIG. 3) which produce spaced apart bonded areas, such as the diamond-shaped areas depicted in FIG. 1, by means of the pressure and heat combination provided by the rolls to the composite web as it is fed through the nip between these rolls. Other thermal bonding means such as ultrasonic welding and the like may be employed as desired. Other techniques for joining the layers of the composite web of the present invention may include physical entanglement of the fibers of the several layers as by hydroentanglement, needle punching or the like. In any event, the preferred bonding of the layers one to another is effected by means of spaced apart, and relatively small, bonding areas that extend over substantially the entire area of the composite web to effectively develop a unitary coherent web from the several layers without detrimental effect upon the desired properties of the web. In a bonding operation, between about 5 and about 75% of the surface area of the composite web comprises bonding areas between the layers of the web. Preferably, however, the total percentage of bond area of the composite web is between about 10 and about 25% of the area of the composite web.

Figure 3:
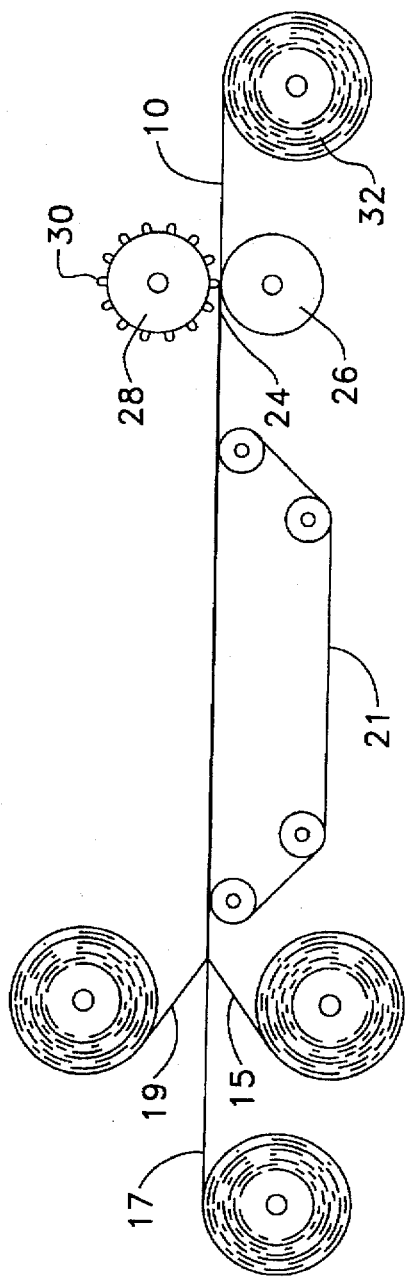
FIG. 3 is a schematic representation of a process for the formation of a web which incorporates various of the features of the present invention.

In one embodiment of a method for the manufacture of the composite web of the present invention, preferably each of the layers of the web is formed individually and overlaid in a laminating-type operation. While held in their overlaid condition, the webs are bonded as described hereinabove. It is to be recognized, however, that the several layers of the present web may be formed substantially simultaneously, as in an inline production process, wherein one of the layers is formed and thereupon a second or further layer is formed on the first or previously formed layer. In this latter instance, the bonding operation may also be inline and at a location downstream of the formation of the final layer of the web. These manufacturing techniques are well known to one skilled in the art of web manufacture. In FIG. 3, there is depicted schematically a process for overlaying previously formed layers 15, 17 and 19 into a web onto a forwardly moving conveyor 21 and thereafter bonding the layers into a coherent web 10 by passing the web through the nip 24 of a set of heated rolls 26 and 28. In this embodiment, the upper roll 28 is provided with a pattern of surface projections 30 which enhance the formation of the desired spaced apart bond areas 16. As depicted, the composite web 10 is collected in a roll 32 for storage and subsequent use. As desired, each of the webs 15 and 19 is formed from man-made fibers, e.g. by spunbonding, meltblowing or other process which provide a coherent self-sustaining web.

Figure 4:
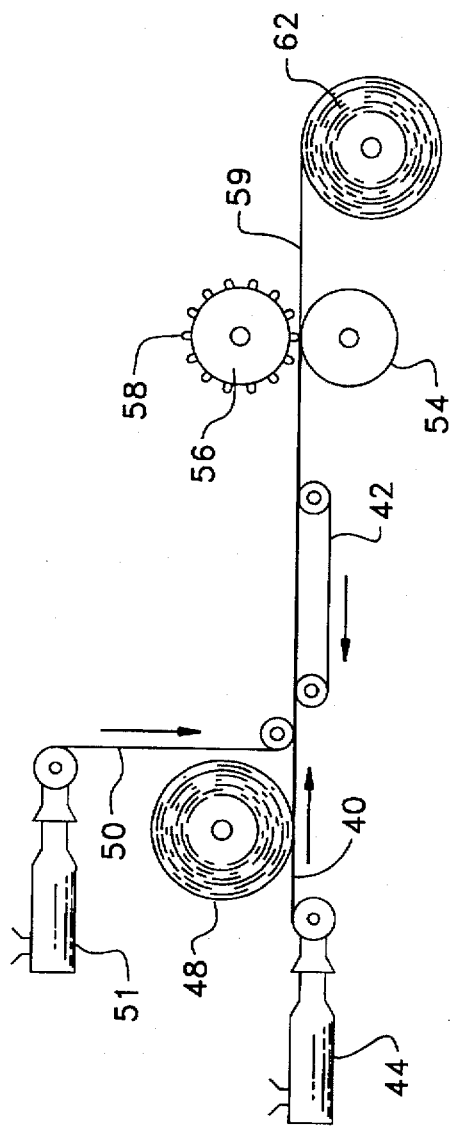
FIG. 4 is a schematic representation of a further process for the manufacture of a web which incorporates various of the features of the present invention.
Figure 5:
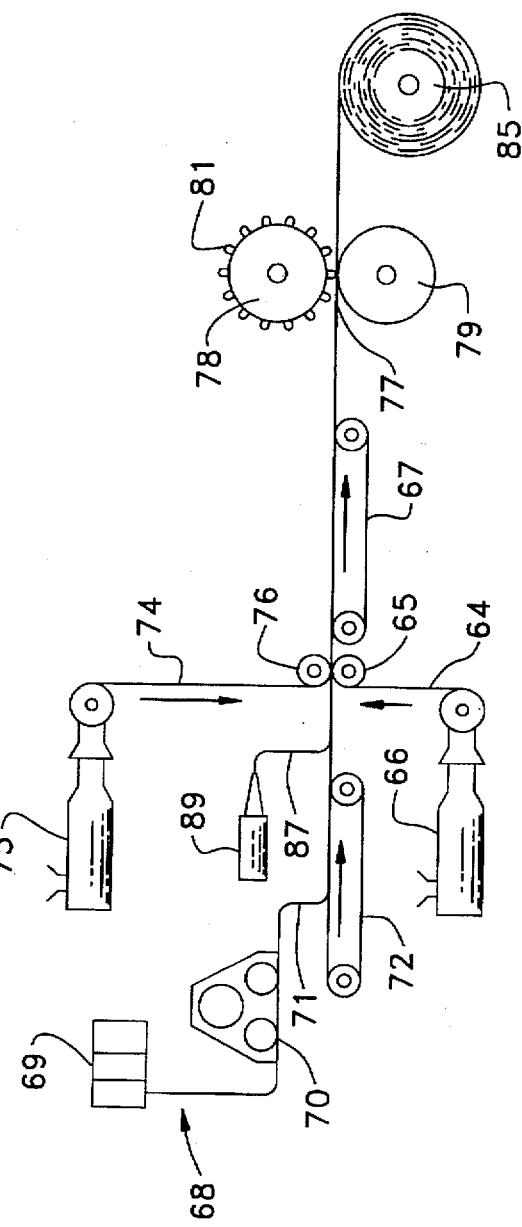
FIG. 5 is a schematic representation of a still further process for the manufacture of a web and depicting in-line web-forming apparatus.

In FIG. 4, there is depicted schematically a process for the manufacture of a web of the present invention in which a first layer 40 of man-made thermoplastic fibers is formed employing a conventional meltblowing or spunbonding process 44 and thereafter deposited on a forwardly moving conveyor 42. A layer 48 of cellulose-based fibers produced either offline or inline as described in FIG. 5, is overlaid onto the first layer 40 that is disposed on the moving conveyor 42. A third layer 50 of thermoplastic man-made fibers is formed by a conventional meltblowing or spunbonding process 51 and overlaid onto the cellulose-based layer 48 to provide a three-layered web in which the cellulose-based fibrous layer 48 is disposed between outer layers 40 and 50 of man-made thermoplastic fibrous material. In the depicted process, these several overlaid layers are fed through the nip of a set of heated pressure rolls 54 and 56, one of which has a pattern of projections 58 on its outer surface, to thermally bond the several layers into a coherent web 59. The composite web may be collected in a roll 62 for further use. As will appear more fully hereinafter, one or both of the first and third layers, 40 and 50, may be formed by conventional meltblowing, spunbonding or like techniques, including thermal bonding of man-made staple fiber webs.

With reference to FIG. 5, there is depicted a further embodiment of a process for the manufacture of a web in accordance with the present invention. In the depicted process, a first web 64 of man-made fibers is formed as by means of an on-line conventional melt-blowing or spun-bonding apparatus 66, fed past an idler roller 65, and deposited on the upper run of a first conveyor 67. As depicted, the process further includes an in-line carding section 68 in which a bale 69 of cellulose-based fibrous material is introduced to an in-line carding unit 70 from which a carded web 71 is fed directly from the carding unit onto a second conveyor 72. From the conveyor 72, the cellulosic web is fed forwardly onto the top of the web 64 on the conveyor 67. Further, a third web 74 of man-made fibers is formed as by means of a further in-line conventional meltblowing or spunbonding apparatus 75 and fed past an idler roller 76, and overlaid upon the top surface of the cellulosic web 71 wherein the cellulosic layer 71 becomes sandwiched between the webs 64 and 74 of man-made fibers. These layers of webs are fed forwardly through the nip 77 of a set of heated rolls 78 and 79, the upper one 78 of which is provided with projections 81 on its outer cylindrical surface for effecting spaced-apart thermal bonds between at least the top web 74 and the cellulosic web 71 to form the layers into a composite web. The bonded composite 83 is collected in a roll 85 for subsequent storage and use. Optionally, a layer of man-made staple fibers may be formed into a web 87 as by means of a conventional air laying web former 89 and interposed into the composite 83 between the cellulosic web 71 and one or both of the man-made fiber webs 64 and 74.

In the present invention, the composite web comprises at least two layers. In any event, at least one of the layers is formed from cellulose-based fibers. "Cellulose-based" as used herein is intended to include staple fibers which are composed of between about 25% and 100% cellulosic material. Suitable cellulosic materials from which the fibers may be obtained include cotton, ramie, hemp, jute, flax, kenaf, bagasse, eucalyptus, rayon (reconstituted cellulose) and combinations thereof, but does not include wood fibers. The chosen cellulosic fiber typically is processed as is well known in the art to provide a clean, bright fiber which readily absorbs liquids. For example, cotton is scoured and bleached to remove the oils, etc. from the fiber and to render the fibers pliant and absorptive, as well as clean of foreign material and bright in color (white being deemed a color). However, a partial scour with little or no bleaching may provide sufficient absorbency and/or wicking for many applications. The cellulosic fibers which are suitable for use in the web of the present invention are of a length of between about 0.50 and about 3 inches(1.27 and 7.62 cm). Cotton fibers preferably range from about 0.5 to about 1.25 inches (1.27 and 3.18 cm ) in length, whereas ramie or flax fibers may range up to about 3 inches (7.62 cm) in length. As desired, the longer fibers may be broken or chopped into shorter lengths. The cellulosic fibers employed are not formed into yarns or threads. The fibers, however, may be processed, as by carding or the like, to orient the fibers or preferably to randomize their orientation, and form the fibers into a self-supporting web. As desired, the fibers may be used directly from the bale as received from the fiber processing operation and in this instance will be introduced to the present web as a layer in which the fibers are carded more or less parallel to each other or are randomly oriented. The cotton fibers preferably are of a fineness of between about 3 and 5 Micronaire units so as to be sufficiently flexible to permit the development of the desired hand and drapability, among other properties, of the composite web of the present invention. Cotton fibers of a size larger than about 5 Micronaire units are less flexible and webs formed therefrom tend to be of harsh and unacceptable hand. Cotton fibers are a preferred form of cellulose-based fibers for use in the composite web of the present invention. Cotton fibers have a nonsmooth surface and exhibit a surface energy of about 44 dyne/cm as compared to a surface energy of polyolefins fibers of about 31 dyne/cm, and thereby exhibit a good tendency to remain in place once layered in the composite web of the present invention. Further, cotton fibers contribute to the composite web excellent properties, such as wicking, absorbency and liquid retention, bulk, liquid repellency but vapor and gas permeability, and strength in some of the composite constructions, particularly if meltblown webs lighter than 0.5 oz/yd$^2$ (17 g/m$^2$) are used.

Regardless of which of the cellulose-based fibers is employed in the make-up of the inner layer of the present multilayered composite web, the inner layer must be formed of staple length fibers, as opposed to filament length fibers. The staple fibers, being of relatively short individual lengths, most often being of a mixture of lengths, all of which are less than about 3 inches(7.62 cm), and preferably less than about 2 inches (5.08 cm ), in length, provide a multiplicity of ends of fibers. Inasmuch as these fibers are not formed into yarns, but are present in the inner layer as individual fibers that preferably have no major orientation other than the fact that they are formed into a web that is sufficiently coherent to be handled by automated equipment for overlaying onto a conveyor or a further web on a conveyor, the fiber ends tend to extend in all directions within the web. Many of the fiber ends, therefore, extend generally laterally of the plane of the web and even project from the flat general surface of the web. This characteristic of the staple fiber web is one of the major reasons that it is unacceptable in this form for use in medical applications. In accordance with the present invention, this heretofore unacceptable web is captured between two webs of man-made nonwoven fibers such that the man-made webs serve to contain the short cellulosic fibers. These man-made fibrous webs, however, must be carefully chosen so as to not deleteriously affect the hand and other of the desired properties of the resultant composite web. Also, importantly, the man-made fibrous webs are chosen for their ability to permit the cellulosic fibers of the inner layer to impart to the composite web those desirable properties of hand and liquid wicking and retention. This is accomplished in the present invention by employing webs of man-made fibers which have been formed into webs by processes which develop substantial void volumes in the webs, but which are formed of fibers having a degree of fineness which enables the webs to simultaneously serve the function of a barrier to bacteria, etc. and without adversely inhibiting the transfer of vapor or liquid through the thickness of the web and into the inner layer of cellulosic fibers where the liquid is rapidly captured and does not strike-through the composite web.

Those ends of the short staple fibers of the inner layer of the composite web which are oriented generally laterally of the plane of the inner layer serve to define many regions of liquid transport into this inner layer. Specifically, the outer layers of the man-made fibers are hydrophobic in nature and have low surface tension values. These fibers also are continuous in length and are poor transporters of liquids. On the other hand, the staple fibers of the inner layer are hydrophilic and have relatively high surface tension values, are nonsmooth, buckled along their length, and present in large numbers so that they tend to draw the liquid into the body of the inner layer. Moreover, the many ends of the staple fibers of the inner layer which extend laterally of the plane of the inner layer define ready pathways for the transport of liquid into the inner layer, both by reason of their affinity to the liquid and the fact that their great numbers, their geometry, and physical orientation in the inner layer define large numbers of capillaries within the inner layer which further enhance the movement of liquids into, and aid in retention of the liquid within, the inner layer. Cotton fibers also swell when wetted so these fibers are preferred in webs where the web is expected to both absorb liquids and serve a barrier function.

As is well recognized in the art, a web of cellulose-based fibers in which the fibers are not bonded one to another is useless in most disposable medical products. First, the web is of insufficient strength to be self-sustaining, and second, the fibers tend to free themselves from the web and thereby introduce unacceptable potential sources of contamination. Loose fibers in surgical gowns, for example, which enter an open wound or incision can be the source of granulomas within the patient and therefore in this application, the fibers must be adequately contained. In accordance with the present invention, the cellulose-based fibers are combined with a layer of thermoplastic man-made fibers. As will be noted hereinafter, the combination of a layer of cellulose-based fibers with a layer of thermoplastic man-made fibers, when the layers are thermally bonded together at spaced apart locations, provides a coherent composite web that exhibits enhanced properties, especially wicking, liquid retention, and strength. In particular, the layer of man-made fibers provides strength and abrasion resistance to the composite web, and therefore, in a preferred composite web, the layer of cellulose-based fibers is sandwiched between outer layers of man-made fibers.

Whereas the meltblown and spunbonded webs of thermoplastic man-made fibers of the prior art have required special and additional treatment following their formation in order to make these webs useful in disposable medical and sanitary products, the present inventors have found that through the combination of selected ones of these webs with selected cellulose-based layers in a bonded composite web, it is possible to produce a composite web which does not require that the man-made fibrous webs be specially treated, but rather these selected webs can be directly incorporated into the composite web of the present invention. This capability provides the present invention with a substantial economic advantage.

In the present invention, the webs of man-made fibers preferably are formed by meltblowing or spunbonding techniques. Meltblown fibers of these man-made fibers preferably are of a diameter of between about 0.5 and about 10.0 micrometers; whereas, the diameters of the fibers in spunbond webs overlap with meltblown webs on the low end at about 8.0 micrometers and may range up to 50 micrometers or more on the upper end of their diameter range. Spunbond webs generally are coarser but stronger than meltblown webs because spunbond fibers are given notable orientation after quenching. In either instance, the fibers are formed into self-sustaining webs. The preferred web weight of a meltblown web for use in the present invention is light weight, having a weight in the range of between about 0.05 and about 10 oz/yd$^2$, and most preferably between about 0.25 and about 2 oz/yd$^2$. The preferred weight of a spunbonded web for use in the present invention is also light weight having a weight between about 0.1 and about 10 oz/yd$^2$, and most preferably between about 0.3 and about 2 oz/yd$^2$. Webs of weights lighter than about 0.05 oz/yd$^2$ tend to be of insufficient fiber density for containing the cellulosic fibers and providing the strength and other properties desired in the composite web. The heavier weight webs, i.e. above about 10 oz/yd$^2$ tend to develop undesirably harsh composite webs when combined with the cellulosic fiber layer. More specific descriptions of the spunbonding and meltblowing processes, and the webs so produced are given in the publication entitled: "Proceedings, Fiber Producer Conference 1983," Apr. 12, 13 & 14, 1983, pp. 6–1 through 6–11, such publication being incorporated herein by reference.

As noted, a preferred composite web in accordance with the present invention comprises an inner layer of cellulose-based fibers which is sandwiched between outer layers of man-made fibers. The composite web, therefore, may comprise different combinations of layers. For example, in addition to the required layer of cellulose-based fibers, the composite web may include a first layer of meltblown man-made fibers facing one surface of the cellulose fibers and a third layer comprising spunbonded man-made fibers facing the opposite surface of the cellulose fiber layer. In like manner, the first and third layers may both be either meltblown or spunbonded fibers. Still further, there may be provided multiple layers of cellulose fibers which may or may not be separated by additional inner layers of man-made fibers, either meltblown or spunbonded. In any event, the cellulose fibers are to be protected by at least one outer layer, and preferably two outer layers, of man-made fibers. It will be recognized that the addition of further layers to the composite web increases the cost of the web and may detract from the hand and other desirable properties of the composite web.

Samples of composite webs employing features of the present invention were manufactured employing the process depicted schematically in FIG. 3. In the preparation of the present samples, the cellulose-based fibers were fed to an opener-mixer where the fibers from a bale were opened and uniformly mixed. The fibers from the opener mixer were fed through a card wherein the fibers were carded to develop a web which was doffed directly from the card, without being wound up, and fed onto a layer of thermoplastic man-made fibers carried on a conveyor. The card employed in the manufacture of the present samples had a randomizing unit attached to its exit end so that the fibers were randomly oriented in the web with little or no preferred orientation in the machine direction. Thereafter, a third layer, comprising thermoplastic man-made fibers, was overlaid on top of the cellulose fiber layer so that the cellulose fiber layer was sandwiched between the two outer layers of thermoplastic man-made fibers. This laminate was then fed through the nip between a set of heated rolls, one of which was of a smooth surface and other of which was provided with a patterns of spaced protections, each of which was of a diamond-shaped cross section. Tables I and II provide further details regarding the operational parameters employed in the preparation of these samples and the composition of the various samples.

TABLE I

Parameters and Their Levels

| Parameter | No. of Levels | Values |
|---|---|---|
| Melt Blown Fabric | | |
| 1. Resin | 2 | Himont Valtec 442, Exxon PD 3495G |
| 2. Fabric weight | 2 | 0.7 oz/yd$^2$, 0.5 oz/yd$^2$ |
| Staple Fiber Web | | |
| 1. Weight | 1 | 1.0 oz/yd$^2$ |
| 2. Constituent Fibers | 2 | Cotton (C), Polypropylene (PP) |
| 3. Fiber Denier | | |
| - Cotton Denier | 1 | 1.75 (Veratec 'Easy Street') |
| - PP Denier | 2 | 2.2 (Hercules T-185) |
| | | 3.0 (BASF bico 'Merge 1080') |
| 4. Fiber Length | | |
| - Cotton Length | 1 | 1.0 inch |
| - PP Length | 1 | 1.5 inch |
| Thermal Bonding Process | | |
| 1. Pattern of engraved roll | 1 | Diamond |
| 2. Area percent of raised pattern | 1 | 16.6%* |
| 3. Nip Pressure | 1 | 250 PLI (pounds/linear inch) |
| 4. Temperature: | | |
| - Top Roll | 4 | 128° C., 133° C., 134° C., 135° C. |
| - Bottom Roll | 4 | 127° C., 129° C., 131° C., 132° C. |
| 5. Surface Speed of Calender Rolls | 1 | 29 ft/min |

*Bonding area of Kusters Calendar used to make samples in Table II

TABLE II

PROCESSING CONDITIONS OF MELT BLOWN/COTTON/MELT BLOWN LAMINATE[1] SAMPLES

| Sample No. | Weight of Layers[2] (oz/yd$^2$) Top/Mid/Bottom | Composition of Layers | | | Bonding Roll Temperature (°C.) | | Composition of Composite Web | |
|---|---|---|---|---|---|---|---|---|
| | | Top | Middle | Bottom | Top | Bottom | Cotton (%) | PP (%) |
| 1 | 0.7/1.0/0.7 | UT-1-24[3] | 100% Cotton | UT-1-24 | 128 | 129 | 41.8 | 58.2 |
| 2 | 0.7/1.0/0.7 | UT-1-24 | 100% Cotton | UT-1-24 | 134 | 129 | 41.8 | 58.2 |
| 3 | 0.7/1.0/0.5 | UT-1-24 | 100% Cotton | UT-1-17[4] | 134 | 129 | 45.4 | 54.6 |
| 4 | 0.7/1.0/0.7 | UT-1-24 | 100% PP[5] | UT-1-24 | 135 | 132 | 0 | 100 |
| 5 | 0.7/1.0/0.5 | UT-1-24 | 100% PP[5] | UT-1-17 | 135 | 132 | 0 | 100 |
| 6 | 0.7/1.0/0.5 | UT-1-24 | 100% BF PP[6] | UT-1-17 | 135 | 132 | 0 | 100 |
| 7 | 0.7/1.0/07 | UT-1-24 | 100% BF PP[6] | UT-1-24 | 135 | 132 | 0 | 100 |

[1] 40-inch webs produced.
[2] Outer layers consisted of different weights of meltblown (MB) Polypropylene (PP) and middle layer consisted of staple fiber.
[3] Himont Resin MB Polypropylene (0.7 oz/yd$^2$).
[4] Himont Resin MB Polypropylene (0.5 oz/yd$^2$).
[5] Hercules Grade T-185 Polypropylene.
[6] BASF bicomponent fiber.

The samples produced as listed in Tables I and II were tested for various properties as indicated below:

Barrier. Barrier refers to the ability of a fabric to resist strike-through of fluid and microorganisms. Barrier properties protect the operating room staff and the patient from infection.

| Test | Test Procedure Used |
|---|---|
| Hydrostatic Pressure | AATCC Test Method 127-1985 |
| Oil Repellency Rating | AATCC Test Method 118-1983 |
| Water Impact Penetration | AATCC Test Method 42-1985 |
| Water Spray Rating | AATCC Test Method 22-1985 |

Strength. Medical nonwovens also need to be strong enough to prevent tearing and puncturing all the way from manufacturing steps through use of the finished product.

| Test | Test Procedure |
|---|---|
| Breaking Load | IST[1] 110.0 - 70 (82) |
| Elmendorf Tear Strength | IST 100.0 - 70 (R82) |
| Mullen Bursting Strength | IST 30.0 - 70 (R82) |
| Tensile Elongation | IST 110.0 - 70 (82) |

Drapability and Comfort. Drapability of a nonwoven fabric refers to its ability to conform to the shape of the object it is covering. The objects include patients, operating room tables and equipment.

Comfort relates to breathability, selection of materials and product design.

| Test | Test Procedure |
|---|---|
| Frazier Air Permeability | IST 70.1 - 70 (R82) |
| Cantilever Bending Length | ASTM D 1388-64 |

The results of these tests are given in Table III.

[1] INDA (Association of the Nonwovens Fabrics Industry) Standard Test.

The data of Table III indicate that the lightweight laminate of the present invention exhibit strength values which are fully suitable for the anticipated use of these laminates as substitutes for the prior art fabrics formed solely from synthetic fibers or filaments, i.e. the prior art SMS fabrics which have heretofore been popular for use in medical applications. The present laminates further exhibit good hand (bending length) and liquid barrier properties, relative to laminates which do not include a layer of cellulosic fibers. As will be seen hereinafter, the laminates of the present invention possess excellent properties relating to liquid absorption, retention and wicking which make the present laminates much more useful and desirable for medical uses, for example.

Repellent Finishing

A fluorochemical finish was given to laminated samples in order to improve their repellency characteristics—toward water, oil, blood, alcohol, and other aqueous liquids—and barrier properties of the fabrics.

A padding technique, a conventional method of applying continuous finish was used to give the laminate samples a fluoro-chemical finish. In this technique, the sample is immersed into the chemical mixture and then passed through the nip of a set of rollers to squeeze out the excess chemicals from the saturated laminate by the application of nip pressure. The nip pressure is adjusted in order to get the desired wet pick up percentage (WPU %). Wet pick up is the amount of finish liquor absorbed by the laminate sample. The unfinished samples were weighed after being cut. The samples passed through the padding mangle for fluoro-chemical finishing were weighed after finishing treatment. The wet pick up percentage was determined as follows:

$$WPU\ \% = \frac{\text{Wt. of Finished Sample} - \text{Wt. of Unfinished Sample}}{\text{Weight of Unfinished Sample}} \times 100$$

The wet pick up percentage of different laminate samples is given in Table IV.

TABLE III

TEST RESULTS OF UNFINISHED LAMINATED FABRICS

| Sample No. | Bending Length (cms) MD | Bending Length (cms) CD | Bursting Strength (psi) | Bursting Strength (kPa) | Strength (gms) MD | Strength (gms) CD | Air Permeability cu.ft/min/ft² | Air Permeability cu.m/sec/m² | Breaking Strength (Kg/cm) MD | Breaking Strength (Kg/cm) CD | Elongation (%) MD | Elongation (%) CD | Hydrostatic Pressure (cm) | Water Spray Rating | Water Impact Penetration (gm) | Oil Repellency Rating |
|---|---|---|---|---|---|---|---|---|---|---|---|---|---|---|---|---|
| 1 | 7.22 | 5.63 | 11 | 75.79 | 98 | 174 | 32.00 | 0.16 | 0.83 | 0.54 | 14 | 21.2 | 34 | 90 | 0.43 | 0 |
| 2 | 7.91 | 5.97 | 9.4 | 64.77 | 84 | 126 | 30.51 | 0.16 | 0.90 | 0.49 | 11.6 | 20 | 32 | 80 | 0.37 | 0 |
| 3 | 7.02 | 5.27 | 7.7 | 53.05 | 68 | 114 | 32.84 | 0.17 | 0.80 | 0.43 | 10.4 | 22.8 | 24 | 70 | 0.9 | 0 |
| 4 | 7.4 | 5.14 | 19.1 | 131.60 | 158 | 694 | 30.90 | 0.16 | 0.97 | 0.50 | 20 | 24.8 | 19 | 70 | 0.83 | 0 |
| 5 | 6.98 | 5.20 | 17.3 | 119.20 | 126 | 488 | 36.70 | 0.19 | 0.88 | 0.40 | 22.4 | 21.6 | 17 | 80 | 4.33 | 0 |
| 6 | 7.37 | 5.14 | 19.4 | 133.67 | 166 | 248 | 36.42 | 0.19 | 1.46 | 0.45 | 24.8 | 24.4 | 42 | 80 | 1.73 | 0 |
| 7 | 7.53 | 5.49 | 19.1 | 131.60 | 112 | 292 | 30.17 | 0.15 | 1.39 | 0.54 | 26 | 24 | 48 | 70 | 0.33 | 0 |
| 8 | 3.68 | 4.04 | 39.5 | 272.16 | 853 | 1209 | 26.37 | 0.132 | 1.42 | 1.59 | 35.6 | 34.4 | 50 | 96 | 0 | 0 |
| 9 | 3.93 | 2.70 | 39.3 | 270.78 | 613 | 660 | 16.77 | 0.083 | 1.49 | 1.35 | 22 | 28.4 | 62 | 70 | 0 | 8.0 |
| 10 | 4.62 | 4.88 | 40.3 | 277.67 | 1179 | 1755 | 13.66 | 0.068 | 1.32 | 1.66 | 31.2 | 35.2 | 77 | 90 | 0 | 0 |
| 11 | 3.90 | 2.94 | 42.5 | 292.83 | 641 | 746 | 11.9 | 0.059 | 1.59 | 1.33 | 24.8 | 27.6 | 58 | 70 | 0 | 7.5 |

Note:
Sample No. 8 = 1.8 oz/sq.yd unfinished SMS (Spunbonded/melt blown/spunbonded) frabric.
Sample No. 9 = 1.8 oz/sq.yd finished SMS fabric.
Sample No. 10 = 2.3 oz/sq.yd unfinished SMS fabric.
Sample No. 11 = 2.3 oz/sq.yd finished SMS fabric.

TABLE IV

WET PICK PERCENTAGE OF MSM LAMINATE SAMPLES

| Sample No. | WPU (%) |
|---|---|
| 1 | 152.10 |
| 2 | 145.50 |
| 3 | 149.43 |
| 4 | 157.96 |
| 5 | 157.90 |
| 6 | 140.91 |
| 7 | 140.11 |

Fluorochemical finishing was carried out using a 18" wide padding mangle. The fluorochemical used to treat the laminate samples was 5"Zonyl" PPR Fabric Protector from Dupont. A wet pick up of 140% was planned for. The samples were given a fluoro-chemical finish in the padding mangle with two dips and two nips at a pressure of 30 psi(207 KPa). The finished samples were then cured in a convection oven at 250° F.(121° C.) for 3.5 minutes on a pin frame. The following fluorochemical formulation was used:

Padding Application (Planned wet pick up of 140%)

| Ingredients | % by weight |
|---|---|
| Zonyl PPR | 3.6 |
| Water | 96.4 |
| Total | 100.0 |

The fluorochemically finished samples were tested for barrier, strength, and drapability and comfort properties using the test procedures as given earlier. The results for finished laminate samples are shown in Tables V.

increase of oil repellency rating from a very poor 0.0 (in unfinished samples) to an excellent range of 6.0–8.0 (in fluorochemically finished samples). Again, the fluorochemically finished samples containing only cotton in the core consistently had the highest oil repellency values of 8.

A further series of samples, numbered 8–15 in the following tables, were prepared for comparison purposes. Except for the Sontara fabrics which contained wood pulp, none of these samples included a cellulose-based fibrous layer, but rather comprised one or more layers of man-made fibers. Table VI gives the composition and method of manufacture of each of these samples.

TABLE VI

NONWOVEN FABRIC CONSTRUCTION AND TYPE OF FINISH

| No. | Fabric Type | Fiber Content | Construction | Finish |
|---|---|---|---|---|
| 8 | Tyvek 1422A | 100% PE[1] | Spunbonded | None |
| 9 | Tyvek 1422R | 100% PE | Spunbonded | Corona Treated |
| 10 | Sontara | 50% Polyester 50% Wood Pulp | Spunlaced Composite | None |
| 11 | Sontara | 50% Polyester 50% Wood Pulp | Spunlaced Composite | DuPont RF[4] |
| 12 | SMS (1.8 oz/yd$^2$) | 100% PP[2] | Lam-SMS[3] | None |
| 13 | SMS (1.8 oz/yd$^2$) | 100% PP | Lam-SMS | KC RF[5] |
| 14 | SMS (2.3 oz/yd$^2$) | 100% PP | Lam-SMS | None |
| 15 | SMS (2.3 oz/yd$^2$) | 100% PP | Lam-SMS | KC RF |

[1]PE — Polyethylene
[2]PP — Polypropylene
[3]Lam-SMS — Thermally point bonded laminate of spunbonded/melt blown/spunbonded nonwoven fabric
[4]DuPont RF — Repellent furnished by DuPont.
[5]KC RF — Repellent furnished by Kimberly-Clark.

TABLE V

TEST RESULTS OF REPELLENT FINISHED LAMINATE FABRICS

| Sample No. | Bending Length (cms) | | Bursting Strength | | Strength (gms) | | Air Permeability | | Breaking Strength (Kg/cm) | | Elongation (%) | | Hydrostatic Pressure (cm) | Water Spray Rating | Water Impact Penetration (gm) | Oil Repellency Rating |
|---|---|---|---|---|---|---|---|---|---|---|---|---|---|---|---|---|
| | MD | CD | (psi) | (kPa) | MD | CD | cu.ft/min/ft$^2$ | cu.m/sec/m$^2$ | MD | CD | MD | CD | | | | |
| 1 | 6.92 | 5.60 | 10.8 | 74.41 | 76 | 108 | 28.28 | 0.14 | 0.80 | 0.48 | 16 | 22 | 45 | 90 | 0.23 | 8 |
| 2 | 6.67 | 5.34 | 10.65 | 73.38 | 66 | 104 | 27.93 | 0.14 | 0.76 | 0.46 | 14 | 14 | 44 | 90 | 0.27 | 8 |
| 3 | 6.87 | 5.65 | 10.45 | 72.00 | 62 | 100 | 32.24 | 0.16 | 0.69 | 0.39 | 14 | 26 | 40 | 80 | 0.33 | 8 |
| 4 | 6.48 | 5.06 | 17.05 | 117.47 | 146 | 664 | 29.91 | 0.15 | 0.91 | 0.46 | 38 | 22 | 39 | 80 | 0.13 | 7 |
| 5 | 5.98 | 5.67 | 16.2 | 111.62 | 122 | 388 | 29.14 | 0.15 | 0.86 | 0.41 | 16 | 20 | 32 | 90 | 0.27 | 8 |
| 6 | 6.58 | 5.41 | 18.7 | 128.84 | 136 | 354 | 29.65 | 0.15 | 1.35 | 0.46 | 30 | 26 | 35 | 80 | 0.17 | 6 |
| 7 | 6.45 | 5.24 | 18.85 | 129.85 | 114 | 404 | 28.19 | 0.14 | 1.41 | 0.51 | 30 | 32 | 40 | 70 | 0.13 | 6 |

The hydrostatic pressure levels needed to pass liquid through the samples were already notably high with the unfinished samples which attest to the good barrier properties provided by the meltblown webs. However, the repellent finished samples 1, 2 and 3 which contained only cotton staple fiber in the center layer had much higher hydrostatic pressure levels than the corresponding unfinished samples, and had generally greater hydrostatic pressure values than the finished samples with only polypropylene (PP) in the center. On the other hand, the hydrostatic pressures of most of the samples with only PP in the core were notably decreased by repellent finishes. The water spray rating of the majority of the finished samples were seen to have increased as a result of fluorochemical finishing. The greatest advantage in applying a fluorochemical finish was seen in the These samples were tested for various of the properties which are considered important in laminates employed as substitutes for woven webs. The results of these tests are given in Table VII.

TABLE VII

WEIGHT, THICKNESS, BENDING LENGTH, AIR PERMEABILITY,
WATER SPRAY RATING, IMPACT PENETRATION AND OIL REPELLENCY
OF REGULAR AND CORONA TREATED "TYVEK" AND OF
UNFINISHED AND REPELLENT FINISHED "SONTARA" AND "SMS" FABRICS[1]

| | "Tyvek" | | "Sontara" | | "SMS" | | | |
| | 1422A | 1422R | | | Nominal 1.8 oz/yd² Weight | | Nominal 2.3 oz/yd² Weight | |
| | Regular Unfinished | Corona Treated Unfinished | Unfinished | Repellent Finished | Unfinished | Repellent Finished | Unfinished | Repellent Finished |
|---|---|---|---|---|---|---|---|---|
| Weight Average (oz/yd²) | 1.30 | 1.23 | 2.11 | 2.14 | 1.78 | 1.84 | 2.32 | 2.38 |
| Thickness Average (mils) | 6.60 | 5.90 | 11.20 | 12.60 | 14.50 | 11.80 | 17.00 | 14.60 |
| Bending Length Average | | | | | | | | |
| Face Side (cm) | 3.92 | 4.13 | 5.28 | 3.46 | 3.67 | 4.04 | 4.54 | 4.90 |
| Back Side (cm) | 4.16 | 5.10 | 7.14 | 4.74 | 4.34 | 3.73 | 3.59 | 4.38 |
| Air Permeability Average (ft³/min/ft²) | 0 | 0 | 52.6 | 58.7 | 17.6 | 10.9 | 10.1 | 5.1 |
| Water Spray Rating (0–100) | | | | | | | | |
| First Set | 90 | 76 | 0 | 90 | 90 | 70 | 90 | 70 |
| Second Set | 90 | 80 | 0 | 90 | 90 | 70 | 90 | 70 |
| Water Impact[2] Penetration (g) | 0 | 0 | 23.7 | 0.2 | 0 | 0 | 0 | 0 |
| Oil Repellency (0–8) | | | | | | | | |
| First Set | 2 | 0 | 0 | 8 | 0 | 8 | 0 | 7.4 |
| Second Set | 2 | 0 | 0 | 8 | 0 | 8 | 0 | 7.6 |
| Bursting Strength (psi) | | | | | 39.5 | 39.3 | 40.3 | 42.5 |
| Hydrostatic Pressure (cms) | | | | | 50.0 | 62.0 | 77.0 | 58.0 |

| | MD | CD | MD | CD | MD | CD | MD | CD |
|---|---|---|---|---|---|---|---|---|
| Tear Strength (gms) | | | 853 | 1209 | 613 | 660 | 1179 | 1755 | 641 | 746 |
| Breaking Strength (kg/cm) | | | 1.42 | 1.49 | 1.35 | 1.32 | 1.66 | 1.59 | 1.33 | |
| Elongation (%) | | | 35.6 | 34.4 | 22.0 | 28.4 | 31.2 | 35.2 | 24.8 | 27.6 |

[1]Each value presents the average of 35 specimens.
[2]Due to the large specimen size required for this test, only one set of five specimens were tested for each sample.

For further comparison several different woven fabrics varying in fiber content, weight and finish and as described in Table VIII were obtained from a commercial source. The 100% cotton denim fabrics would be used as trouser materials. The poplin fabrics would be used for both pants and shirts. The denim fabrics were available in nominal weights of 10, 12 and 14.5 oz/yd² (340, 410 and 490 g/m²). The "indigo" denims consisted of greige fabrics (not desized), desized and light scoured fabrics, and desized, lightly scoured and fluorochemical finished fabrics. The "white" denim fabrics and the poplin fabrics were desized, scoured and bleached. A portion of the "white" denim fabrics were also fluorochemical finished. The poplin fabrics were evaluated after the stages of desizing, scouring and bleaching, durable process finishing and after the combination of durable press and fluorochemical finishing. All the preparatory finishing, and durable press and repellent finishing processes were performed using commercial equipment at a commercial facility. Data further identifying these fabrics are given in Table VIII. The results of tests performed on the fabrics are given in Table IX.

TABLE VIII

YARN COUNT, THREAD COUNT AND TYPE OF CONSTRUCTION OF DENIM AND POPLIN FABRICS

| Fabric | Description | Nominal Yarn Weight (oz/yd$^2$) | Warp | Fill | Count Ends/ Inch | Picks/ Inch | Fabric Construction |
|---|---|---|---|---|---|---|---|
| *100% Cotton Denims* | | | | | | | |
| 13-A-B1[1] | Not Desized | 10.0 | 6.20 | 9.49 | 65 | 48 | 2 × 1 Twill |
| 13-B-B1 | | 12.0 | 5.77 | 7.39 | 72 | 45 | 3 × 1 Twill |
| 13-C-B1 | | 14.5 | 4.52 | 5.58 | 61 | 43 | 3 × 1 Twill |
| 14-A-W[2] | Desized & | 10.0 | 8.80 | 7.35 | 76 | 44 | 3 × 1 Twill |
| 124-A-B1[3] | Scoured | 10.0 | 8.13 | 10.56 | 65 | 42 | 2 × 1 Twill |
| 14-B-B1 | | 12.0 | 8.02 | 7.84 | 73 | 41 | 3 × 1 Twill |
| 14-C-W | | 14.5 | 6.74 | 5.75 | 68 | 42 | 3 × 1 Twill |
| 14-C-B1 | | 14.5 | 5.28 | 5.59 | 61 | 40 | 3 × 1 Twill |
| 15-A-W | Desized, | 10.0 | 9.21 | 6.92 | 75 | 43 | 3 × 1 Twill |
| 15-A-B1 | Scoured & | 12.0 | 7.79 | 8.85 | 73 | 41 | 3 × 1 Twill |
| 15-C-W | | 14.5 | 6.57 | 5.25 | 66 | 41 | 3 × 1 Twill |
| 15-C-B1 | | 14.5 | 6.29 | 5.84 | 62 | 39 | 3 × 1 Twill |
| *100% Cotton Poplins* | | | | | | | |
| 16-W | D + S + B[4] | | 16.10 | 13.89 | 64 | 56 | Plain |
| 17-W | D + S + B + DP[5] | | 15.60 | 13.08 | 66 | 56 | Plain |
| 18-W | D + S + B + DP + FC[6] | | 15.15 | 11.54 | 66 | 54 | Plain |
| *75/25 Cotton/Polyester Poplins* | | | | | | | |
| 19-W | D + S + B | | | | 66 | 56 | Plain |
| 20-W | D + S + B + DP | | | | 67 | 55 | Plain |
| 21-W | D + S + B + DP + FC | | | | 66 | 56 | Plain |

[1] B1 indicates Indigo Denim Fabrics.
[2] W indicates White Denim Fabrics. The White Denim Fabrics were Desized, Scoured and Bleached.
[3] Indigo Denim Fabrics were given a Light Desizing and Scouring treatment
[4] Desized, Scoured and Bleached.
[5] Desized, Scoured, Bleached and Durable Press Finished.
[6] Desized, Scoured, Bleached, Durable Press and Fluorocarbon Finished.

TABLE IX

FABRIC WEIGHT, THICKNESS AND AIR PERMEABILITY VALUES OF DENIM AND POPLIN FABRICS[1]

| Fabric Number | Description | Nominal Weight (oz/yd$^2$) | Actual Weight (oz/yd$^2$) | Weight (g/m$^2$) | Thickness (mils) | Air Permeability (ft$^3$/min/ft$^2$) | Air Permeability (m$^3$/sec/m$^2$) |
|---|---|---|---|---|---|---|---|
| *100% Cotton Denims* | | | | | | | |
| 13-A-B1[3] | Not Desized | 10.0 | 10.55 | 357.74 | 31.53 | 16.65 | 0.085 |
| 13-B-B1 | | 12.0 | 12.67 | 429.72 | 35.90 | 23.52 | 0.119 |
| 13-C-B1 | | 14.5 | 14.92 | 505.81 | 39.36 | 16.11 | 0.082 |
| 14-A-W[4] | Desized & | 10.0 | 9.77 | 331.33 | 25.74 | 7.06 | 0.036 |
| 14-A-B1[5] | Scoured | 10.0 | 8.24 | 279.45 | 21.96 | 13.81 | 0.070 |
| 14-B-B1 | | 12.0 | 9.63 | 326.35 | 26.85 | 13.47 | 0.068 |
| 14-C-W | | 14.5 | 11.38 | 385.92 | 28.89 | 7.73 | 0.039 |
| 14-C-B1 | | 14.5 | 11.54 | 391.24 | 30.20 | 9.59 | 0.049 |
| 15-A-W | Desized | 10.0 | 9.88 | 334.86 | 25.43 | 6.57 | 0.038 |
| 15-A-B1 | Scoured & | 10.0 | 8.23 | 278.88 | 32.01 | 13.86 | 0.070 |
| 15-B-B1 | FC Finished | 12.0 | 9.67 | 327.97 | 26.31 | 11.73 | 0.060 |
| 15-C-W | | 14.5 | 11.47 | 388.90 | 28.30 | 8.18 | 0.042 |
| 15-C-B1 | | 14.5 | 11.67 | 395.68 | 30.08 | 8.98 | 0.046 |
| *100% Cotton Poplins* | | | | | | | |
| 16-W | D + S + B[6] | | 5.53 | 187.47 | 15.63 | 37.15 | 0.189 |
| 17-W | D + S + B + DP[7] | | 5.74 | 194.65 | 15.68 | 37.91 | 0.193 |
| 18-W | D + S + B + DP + FC[8] | | 5.82 | 197.37 | 15.67 | 39.13 | 0.199 |

TABLE IX-continued

FABRIC WEIGHT, THICKNESS AND AIR PERMEABILITY VALUES OF DENIM AND POPLIN FABRICS[1]

| Fabric Number | Description | Nominal Weight (oz/yd$^2$) | Actual Weight (oz/yd$^2$) | Weight (g/m$^2$) | Thickness (mils) | Air Permeability (ft$^3$/min/ft$^2$) | (m$^3$/sec/m$^2$) |
|---|---|---|---|---|---|---|---|
| | | 75/25 Cotton/Polyester Poplins | | | | | |
| 19-W | D + S + B | | 5.52 | 186.99 | 16.14 | 27.54 | 0.140 |
| 20-W | D + S + B + DP | | 5.78 | 196.08 | 15.87 | 26.58 | 0.135 |
| 21-W | D + S + B + DP + FC | | 5.85 | 198.45 | 15.78 | 26.53 | 0.135 |

[1]The value for each fabric represents the average of 50 specimens measured twice.
[2]The value for each fabric represents the average of 50 specimens
[3]B1 indicates Indigo Denim Fabrics.
[4]W indicates White Denim Fabrics. The White Denim Fabrics were Desized, Scoured and Bleached.
[5]Indigo Denim Fabrics were given a Light Desizing and Scouring Treatment.
[6]Desized, Scoured and Bleached.
[7]Desized, Scoured, Bleached and Durable Press Finished.
[8]Desized, Scoured, Bleached, durable Press and Fluorocarbon Finished.

The composite webs of the present invention exhibited hand and drapability approximating that of woven webs of the type heretofore used in surgical gowns and similar medical applications. The air permeability of the present composite webs, i.e, between about 25 and about 37 ft$^3$/min/ft$^2$(0.127 and 0.188 m$^3$/sec/m$^2$), also is comparable to that of woven webs such as shirting material and therefore provides barrier properties and breathability equivalent to such woven webs. The presence of the fibrous layer in the present composite web provides enhancement of the filtration efficiency of the present web over the single-layered woven webs of the prior art, thereby enhancing the usefulness of the present composite web in applications where the barrier properties of the web are of importance.

Figure 6:
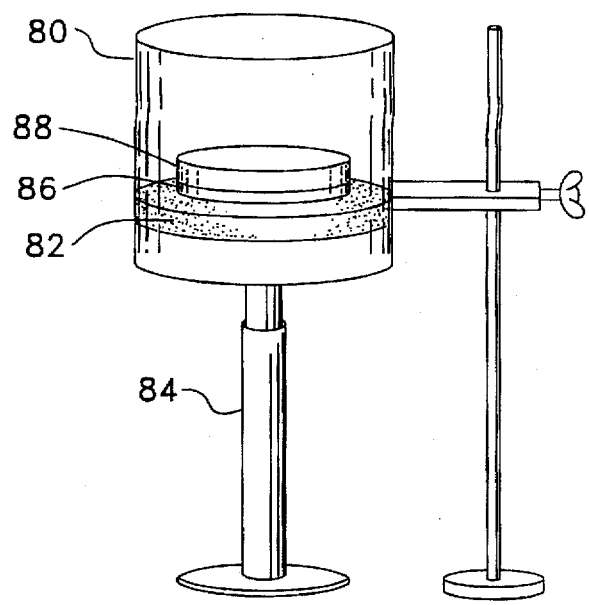
FIG. 6 is a representation of apparatus for use in liquid absorptivity and retention testing of webs.

The absorbent capacity and retention capacity of several prior art fabrics, cotton mats and laminates made in accordance with the present invention were examined. The absorbent capacity was determined by using an adaptation of the procedure developed at the Swedish Institute for Textile Research (TEFO) and reported by Shishoo (TAPPI Journal, July 1987). FIG. 6 depicts the testing apparatus which consists of a large funnel 80 with a glass frit 82 and a graduated collection cylinder 84. A circular specimen 86 with an area of 100 cm$^2$ was conditioned overnight at 21° C. and 65% RH. The sample was placed face upwards on the glass frit. One hundred milliliters of liquid delivered at a rate of 7 mm/sec from a height of 2.54 cm was used to saturate the specimen. A 100 cm$^2$ circular weight 88 of 100 gm was promptly placed on the saturated specimen and the assembly allowed to drain for 10 minutes. The amount of liquid collected in the cylinder was determined and used to calculate the absorbent capacity (C) of the product by the following calculation.

C=a−b where a=total liquid dosage (100 ml) and b=liquid unabsorbed (ml) under 100Pa pressure. Seven replications were completed for each sheet examined and the results are reported to the nearest milliliter. The retention capacity was determined as a continuation of the absorbent capacity determination. After determining the amount of unabsorbed liquid at the end of 10 minutes in the capacity test, 2.9 kg of weight was loaded on top of the sample for a total pressure of 3 kPa (100 Pa were already on the specimen from the capacity test) and the assembly allowed to drain for five minutes. The amount of liquid in the cylinder at the end of this elapsed time was noted and an additional 2 kg of weight were added for a final total of 5 kPa. The wetted sample was allowed to stand for five more minutes and the amount of liquid collected in the cylinder was then determined. The amount of liquid, ($C_{rm}$ and $C'_{rm}$) retained in the sample under the two different pressures was determined by;

$C_{rm}$=C−c where C=absorption capacity c=liquid unabsorbed under 3 kPa pressure and $C'_{rm}$=C−c' where C=absorption capacity c'=liquid unabsorbed under 5 kPa pressure Seven replications of this test were completed for each sheet and the results expressed to the nearest milliliter. The results of these tests are given in Table XI. For further comparison, the absorbent capacity and retention capacity of 100% carded cotton webs under various weight loadings are also shown in Table XII. Sample Nos. 37–40 of Table XI do not contain a cellulosic fiber layer. Notably their absorbent and retention capacities are negligible. From these data and the data of earlier tables, it is readily apparent that the laminates of the present invention are superior in many physical respects over the man-made nonwoven fabrics of the prior art, especially for medical and like applications. The present fabrics also are lightweight and, in fact, those fabrics having lesser amounts (by weight) of meltblown material were noted to be superior with respect to liquid absorbent and retention capacities, thereby affording an economic advantage also. Further, as shown in Table XII, even though 100% cotton webs were noted to lose some of their retention capacity as the weight of the web increased, when these same cotton webs were incorporated into the laminated structure of the present invention, the resultant laminate unexpectedly exhibited improved retention capacity with increasing weight of cotton in the inner layer.

TABLE X

Laminated Fabrics Bonded on Kusters Calender[1]

| Sample No. | Sample Designation (Top Layer) | Polymer Composition of MB Webs (Top Layer) | Sample Designation (Bottom Layer) | Polymer Composition of Webs (Bottom Layer) | Weight of Core Web (oz/yd$^2$) |
|---|---|---|---|---|---|
| 20 | OC-13-88-5 | 1.5 oz/yd$^2$ EVA | OC-13-88-5 | 1.5 oz/yd$^2$ EVA | 1.0 Cotton[2] |
| 21 | JA-12-88 | 1.0 oz/yd$^2$ EMA | JA-12-88 | 1.0 oz/yd$^2$ EMA | 1.0 Cotton[2] |
| 22[3] | May 1-90-3 | 1.0 oz/yd$^2$ Nylon 6 | May 1-90-3 | 1.0 oz/yd$^2$ Nylon 6 | 1.0 Cotton[2] |
| 23[3] | OC-25-90-2 | 1.0 oz/yd$^2$ Eastman PET 12270 | OC-25-90-2 | 1.0 oz/yd$^2$ Eastman PET 12270 | 1.0 Cotton[2] |
| 24[3] | AU-20-91-8 | 1.0 oz/yd$^2$ Celanese PBT 1300A | AU-20-91-8 | 1.0 oz/yd$^2$ Celanese PBT 1300A | 1.0 Cotton[2] |
| 25A, 25B | NO-15-90-1B | 1.0 oz/yd$^2$ PE | NO-15-90-1B | 1.0 oz/yd$^2$ PE | 1.0 Cotton[2] |
| 26A, 26B, 26C | OC-11-89-3 | 0.25 oz/yd$^2$ PP | OC-11-89-3 | 0.25 oz/yd$^2$ PP | 1.0 Cotton[2] |
| 27[3] | OC-12-89-5 | 1.0 oz/yd$^2$ Blue PP | OC-12-89-5 | 1.0 oz/yd$^2$ Blue PP | 1.0 Cotton[2] |
| 28A, 28B, 28C[3] | UT-1-24 | 0.7 oz/yd$^2$ PP | UT-1-24 | 0.7 oz/yd$^2$ PP | 2.0 Cotton[2] |
| 29A, 29B, 29C[3] | UT-1-24 | 0.7 oz/yd$^2$ PP | UT-1-24 | 0.7 oz/yd$^2$ PP | 3.0 Cotton[2] |
| 30A, 30B, 30C[3] | UT-1-24 | 0.7 oz./yd$^2$ PP | UT-1-24 | 0.7 oz/yd$^2$ PP | 4.0 Cotton[2] |
| 31A, 31B, 31C, 31D | UT-1-24 | 0.7 oz/yd$^2$ PP | UT-1-24 | 0.7 oz/yd$^2$ PP | 1.0 Cotton[2] |
| 32A, 32B, 32C, 32D | UT-1-24 | 0.7 oz/yd$^2$ PP | UT-1-24 | 0.7 oz/yd$^2$ PP | 1.0 Ramie |
| 33 | UT-1-24 | 0.7 oz/yd$^2$ PP | 100% PP SB | 0.6 oz/yd$^2$ PP | 3.0 Cotton[2] |
| 34 | UT-1-24 | 0.7 oz/yd$^2$ PP | 100% PP SB | 0.6 oz/yd$^2$ PP | 1.0 Ramie |
| 35 | UT-1-24 | 0.7 oz/yd$^2$ PP | 100% PP SB | 0.6 oz/yd$^2$ PP | 2.0 Ramie |
| 36 | UT-1-24 | 0.7 oz/yd$^2$ PP | 100% PP SB | 0.6 oz/yd$^2$ PP | 3.0 Ramie |
| 37 | UT-1-24 | 0.7 oz/yd$^2$ PP | UT-1-24 | 0.7 oz/yd$^2$ PP | — |
| 38 | UT-1-24 | 0.7 oz/yd$^2$ PP | UT-1-17 | 0.5 oz/yd$^2$ PP | — |
| 39 | OC-11-89-3 | 0.25 oz/yd$^2$ PP | OC-11-89-3 | 0.25 oz/yd$^2$ PP | — |
| 40 | UT-1-24 | 0.7 oz/yd$^2$ PP | 100% PP SB | 0.6 oz/yd$^2$ PP | — |
| 41 | 100% PP SB | 0.9 oz./yd$^2$ PP | 100% PP SB | 0.9 oz/yd$^2$ PP | 2.0 Cotton[2] |
| 42 | 100% PP SB | 0.9 oz./yd$^2$ PP | 100% PP SB | 0.9 oz/yd$^2$ PP | 1.0 Cotton[2] |
| 43 | 100% PP SB | 0.6 oz./yd$^2$ PP | 100% PP SB | 0.6 oz/yd$^2$ PP | 2.0 Cotton[2] |
| 44 | 100% PP SB | 0.6 oz/yd$^2$ PP | 100% PP SB | 0.6 oz/yd$^2$ PP | 1.0 Cotton[2] |
| 45 | Thermal Bonded | 0.6 oz/yd$^2$ TBS[42] PP | Thermal Bonded | 0.6 oz/yd$^2$ TBS[3] PP | 1.0 Cotton[2] |
| 46 | 100% PP SB | 0.6 oz/yd$^2$ PP | Thermal Bonded | 0.6 oz/yd$^2$ TBS[3] PP | 1.0 Cotton[2] |
| 47 | Thermal Bonded | 0.6 oz/yd$^2$ TBS[3] PP | UT-1-24 (MB) | 0.7 oz/yd$^2$ PP | 4.0 Cotton[2] |

[1] Laminated and thermally bonded with a Kusters Calender with a diamond pattern with 14.7% bonding area. Samples 20 and 21 were bonded at 150 PLI pressure with 41° C. on the top patterned roll and 41° C. on the bottom smooth roll at a fabric speed of 10 yd/min (9.1 m/min). Samples 25A and 25B were bonded using a top roll temperature of 88° C. and bottom roll temperature of 90° C. with 250 PLI and a fabric speed of 10 yd/min (9.1 m/min). Samples 26A and 26B were bonded using a top roll temperature of 105° C. and bottom roll temperature of 100° C. with 250 PLI and a fabric speed of 10 yd/min (9.1 m/min). Samples 22, 23, 24, 27, 28A, 28B, 28C, 29A, 29B, 29C, 30A, 30B, 30C, 31A, 31B, 32A and 32B were bonded using a top roll temperature of 134° C. and bottom roll temperature of 129° C. with 250 PLI and a fabric speed of 10 yd/min (9.1 m/min). The remainder of these samples, not otherwise designated, were laminated under the same conditions except the temperature of the top and bottom rolls were 125° C. and 122° C. respectively.

[2] Veratec "Easy Street" desized, scoured, and bleached cotton carded on 40 - inch Hollingsworth - On - wheels card and with a combination of flats and half granular clothing. The webs were rolled up on a cylinder 18 cms wide and 1.5 meters in circumference.

[3] Not calendered

[4] Thermally bonded staple fiber nonwoven obtained from Veratec.

NOTE:
(a) Samples 31C and 31D; and 32C and 32D were bonded with a Ramisch Kleinewefers calender with 21.6% bonding area at 250 PLI pressure with 134° C. on the top roll and 129° C. on the bottom roll and a fabric speed of 10 yd/min (9.1 m/min).
(b) Samples 26D, 26E, and 26F; 28D, 28E, and 28F; 29D, 29E, and 29F; 30D, 30E, and 30F were bonded with a Ramisch Kleinewefers calender with 21.6% bonding area at 250 PLI pressure with 134° C. on the top roll and 129° C. on the bottom roll and a fabric speed of 10 yd/min (9.1 m/min).

TABLE XI

ABSORBENT CAPACITY AND RETENTION CAPACITY

| Sample No. | Absorption Capacity (100 Pa)$^1$ | Retention Capacity (3 kPa)$^2$ | Retention Capacity (5 kPa)$^3$ |
|---|---|---|---|
| Tyvek 1422A | 5 | 5 | 5 |
| Tyvek 1422R | 6 | 5.5 | 5 |
| Sontara (unfinished) | 8 | 7 | 7 |
| SMS (unfinished) (1.8 OSY) | 8 | 8 | 8 |
| SMS (unfinished) (2.3 OSY) | 5 | 5 | 5 |
| 20* | 12 | 10 | 9.5 |
| 21* | 9.5 | 9.0 | 8.5 |
| 22* | 14 | 12 | 12 |
| 25A,25B* | 7.0 | 6.0 | 6.0 |
| 26A,26B* | 8.5 | 8.0 | 8.0 |
| 27* | 8.5 | 8.0 | 8.0 |
| 28* | 11 | 9.5 | 9.0 |

TABLE XI-continued

ABSORBENT CAPACITY AND RETENTION CAPACITY

| Sample No. | Absorption Capacity (100 Pa)[1] | Retention Capacity (3 kPa)[2] | Retention Capacity (5 kPa)[3] |
| --- | --- | --- | --- |
| 29* | 14.5 | 12 | 11.5 |
| 30* | 17 | 14.5 | 14 |
| 31A,31B* | 8 | 7.0 | 6.5 |
| 32A,32B* | 7.5 | 6.5 | 6.0 |
| 33* | 18 | 15 | 14 |
| 34* | 7 | 6.5 | 6.0 |
| 35* | 12 | 11 | 11 |
| 36* | 17 | 14 | 13 |
| 37* | 4 | 4.0 | 4.0 |
| 38* | 7 | 7.0 | 7.0 |
| 39* | 8 | 7.5 | 7.5 |
| 40* | 7 | 7.0 | 7.0 |
| 41 | 16 | 14 | 13.5 |
| 42 | 9.0 | 7.5 | 7.0 |
| 43 | 14 | 11 | 10.5 |
| 44 | 10 | 9.0 | 8.0 |
| 45 | 12 | 11 | 11.0 |
| 46 | 8.5 | 7.0 | 7.0 |
| 47 | 28 | 18 | 17 |

*See Tables VI and X for description of samples (Sample Nos. correspond with those in Tables VI and X)
[1]Determined by subtracting the amount of liquid drained into the graduated cylinder at the end of 10 minutes from the original 100 ml dosage.
[2]Determined by subtracting the amount of liquid unabsorbed at 3 kPa pressure from the absorption capacity.
[3]Determined by subtracting the amount of liquid unabsorbed at 5 kPa pressure from the absorption capacity.

TABLE XII

| Sample No. | Absorption Capacity (100 Pa)[1] | Retention Capacity (3 kPa)[2] | Retention Capacity (5 kPa)[3] |
| --- | --- | --- | --- |
| 1.0 oz/sq. yd. | 24 | 20.5 | 19.5 |
| 2.0 oz/sq. yd. | 33 | 20.0 | 19.0 |
| 3.0 oz/sq. yd. | 34 | 18.5 | 16.5 |
| 4.0 oz/sq. yd. | 46 | 23 | 21.0 |

[1]Determined by subtracting the amount of liquid drained into the graduated cylinder at the end of 10 minutes from the original 100 ml dosage.
[2]Determined by subtracting the amount of liquid unabsorbed at 3 kPa pressure from the absorption capacity.
[3]Determined by subtracting the amount of liquid unabsorbed at 5 kPa pressure from the absorption capacity.

Figure 7:
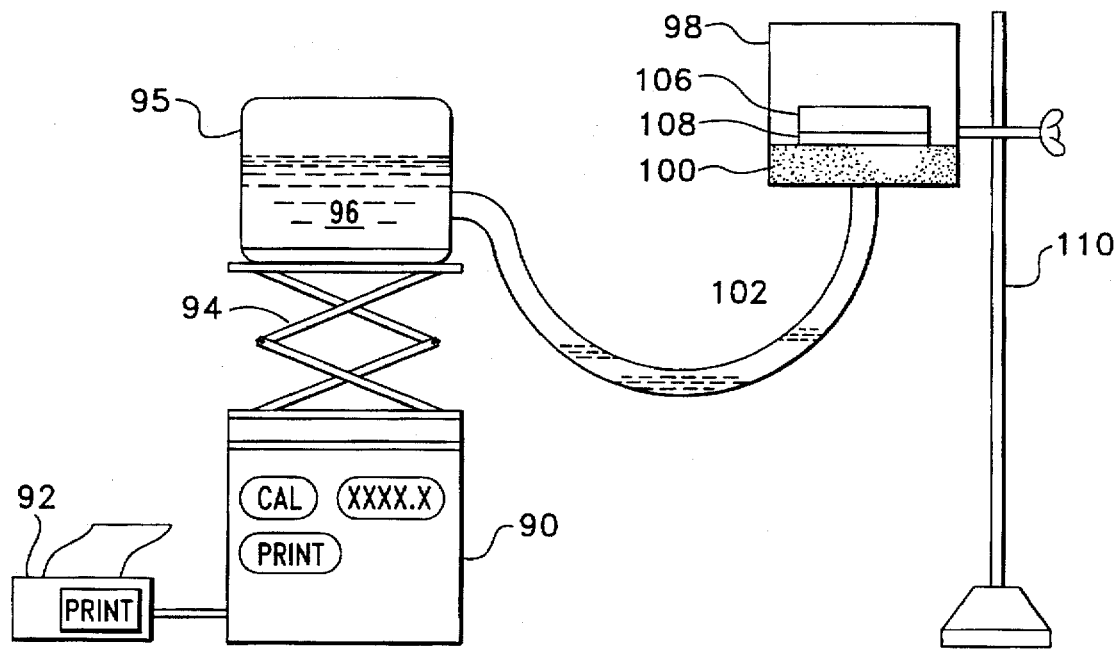
FIG. 7 is a representation of apparatus for use in testing the wicking property of webs.
Figure 8:
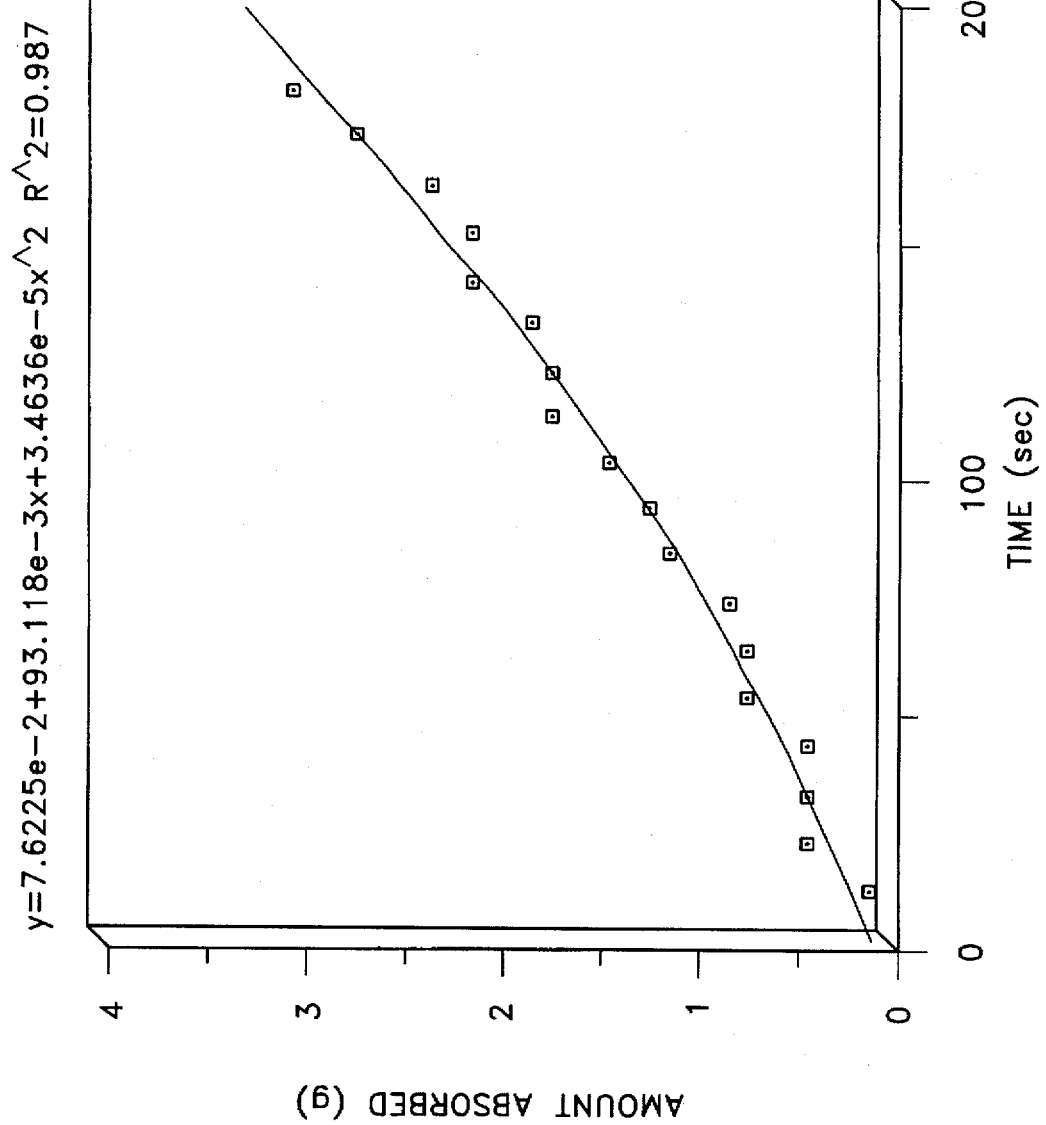
FIGS. 8 through 34 are graphs depicting the wicking values of samples as identified in Table X.
Figure 9:
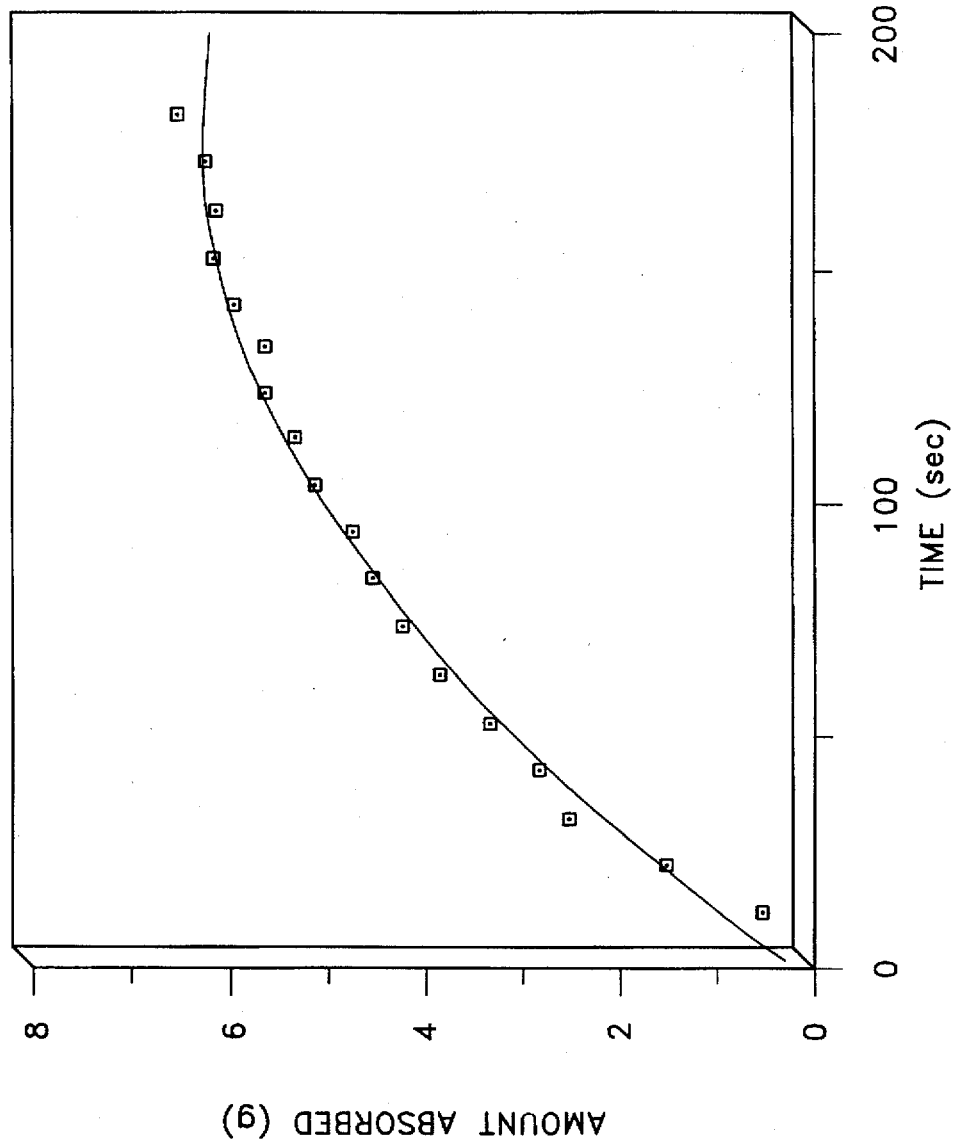
Figure 10:
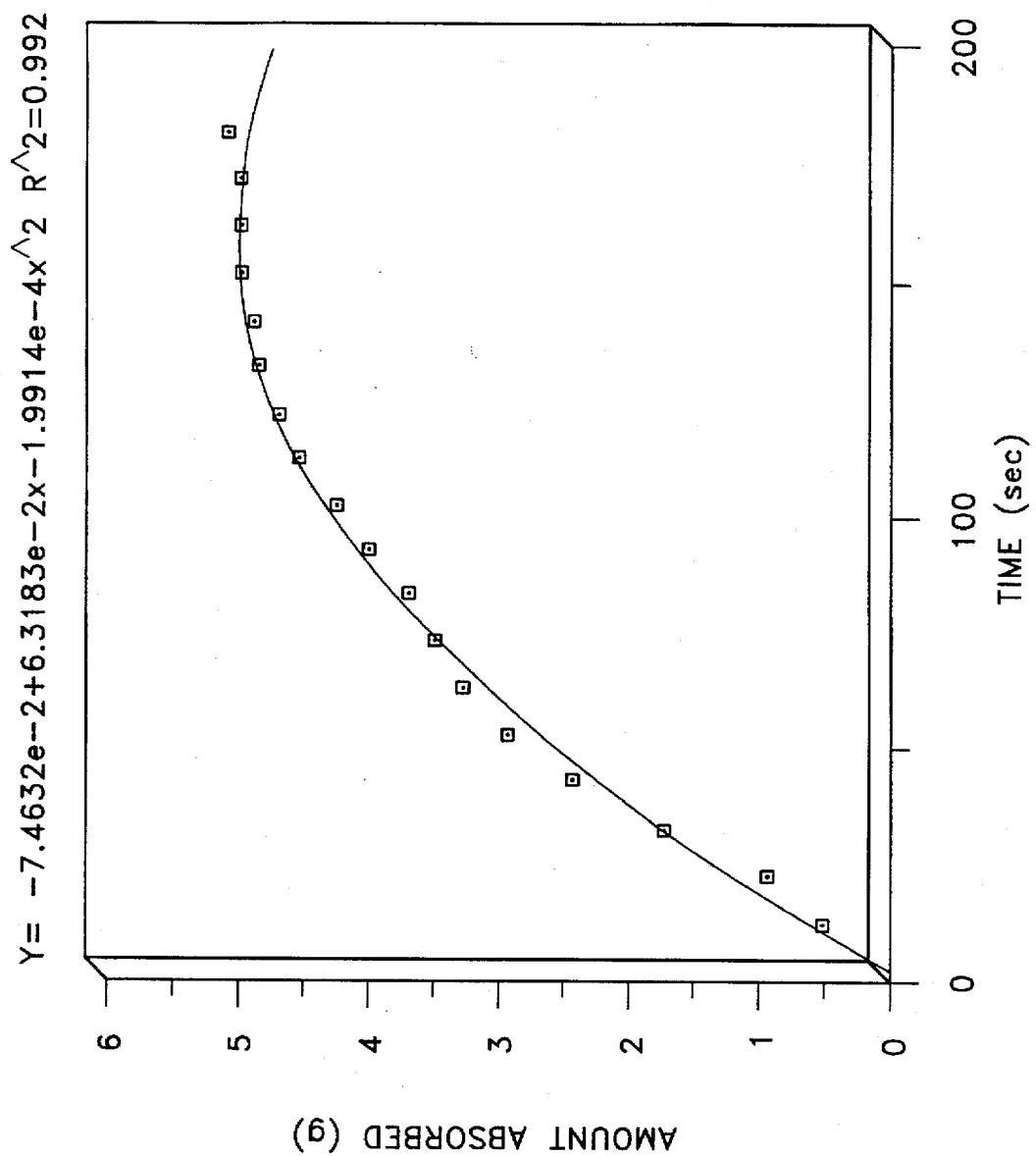
Figure 11:
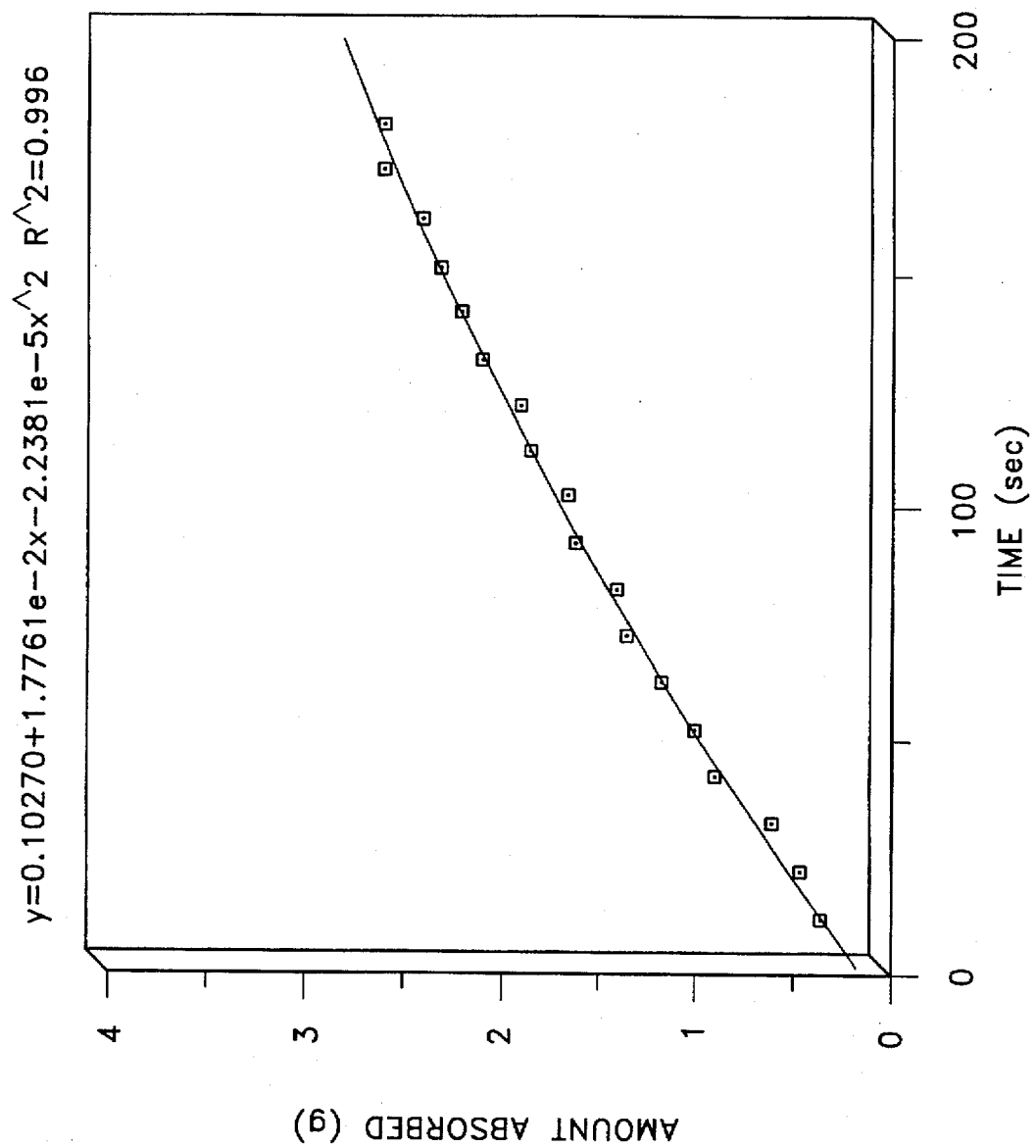
Figure 12:
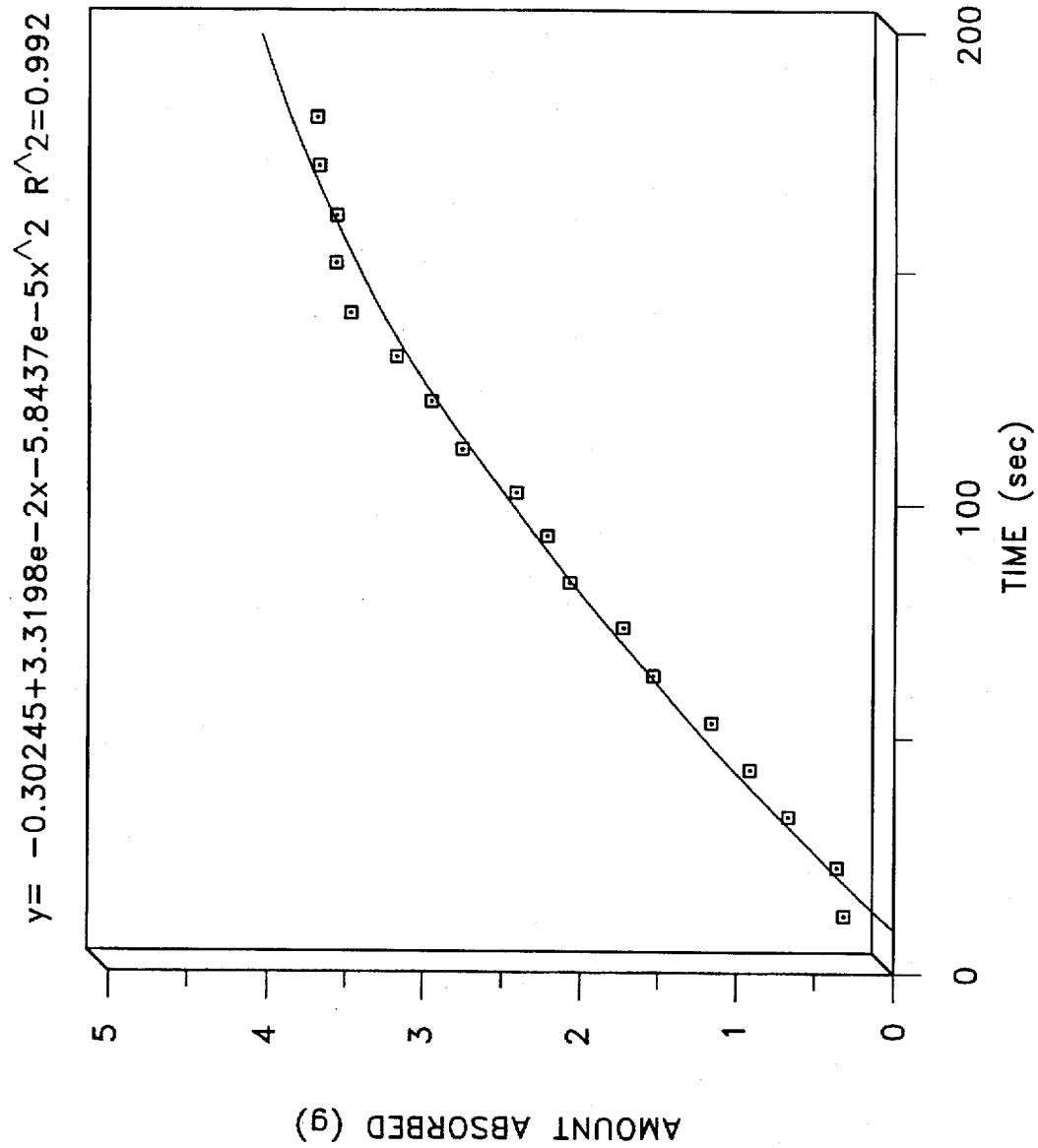
Figure 13:
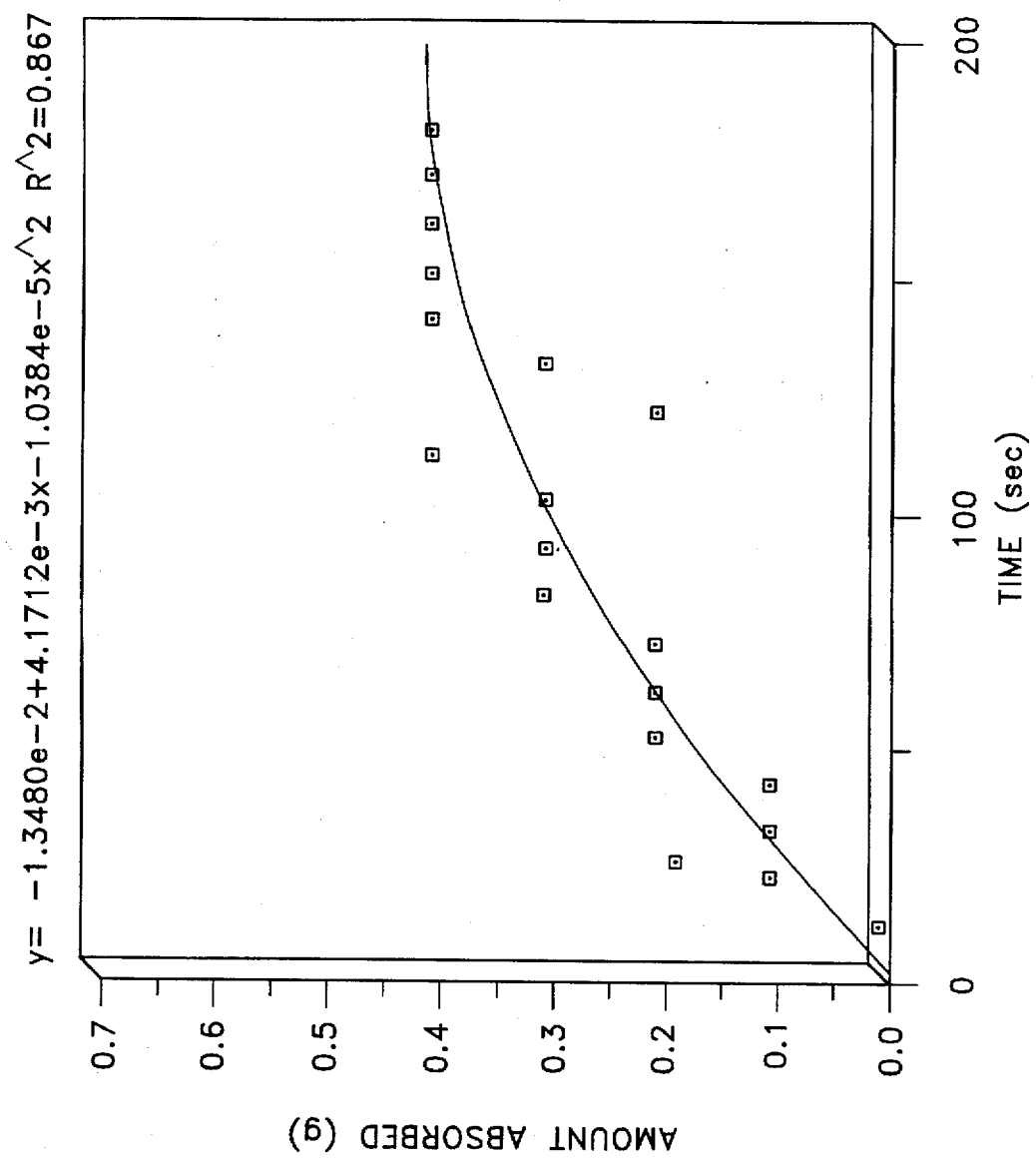
Figure 14:
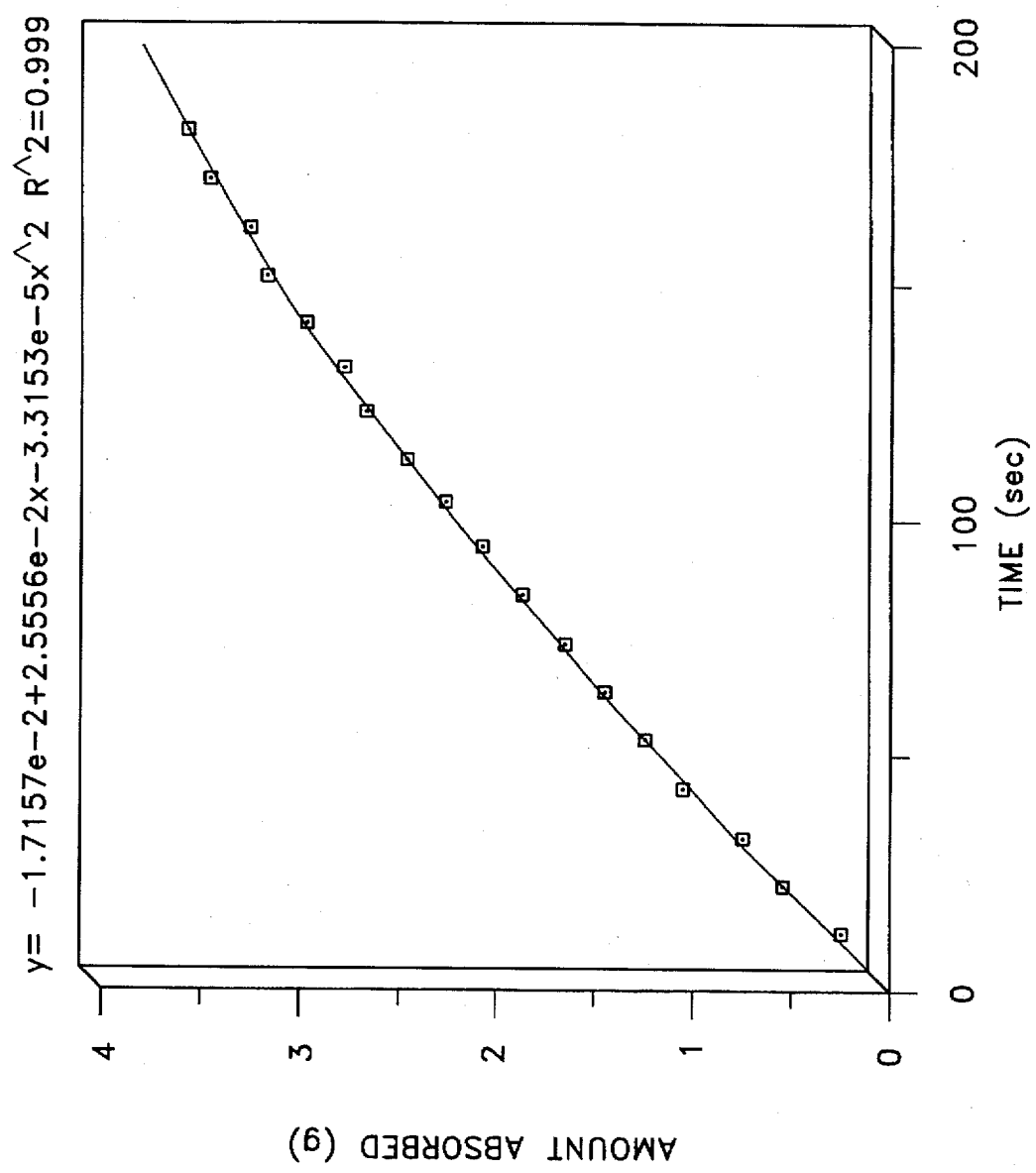
Figure 15:
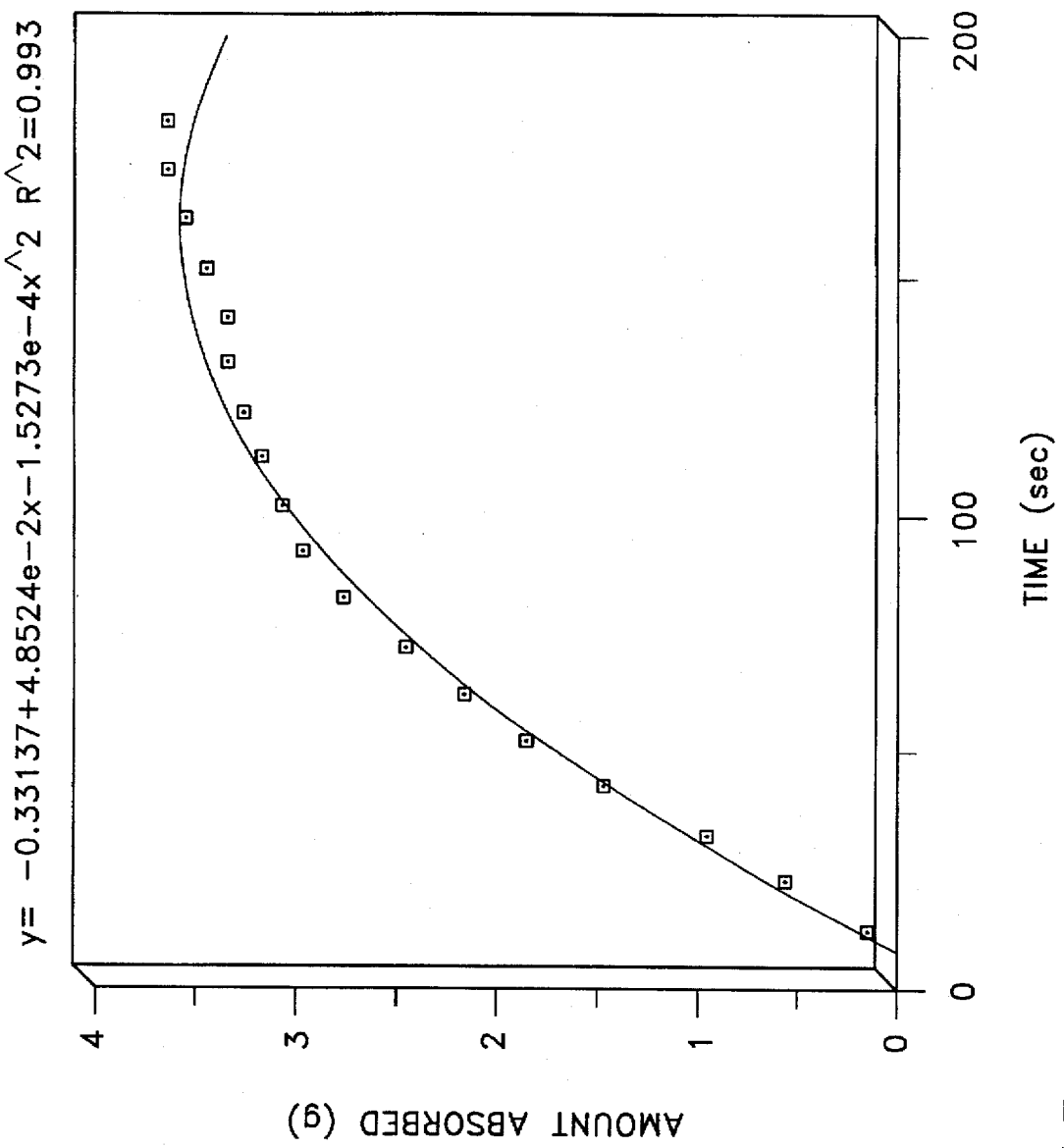
Figure 16:
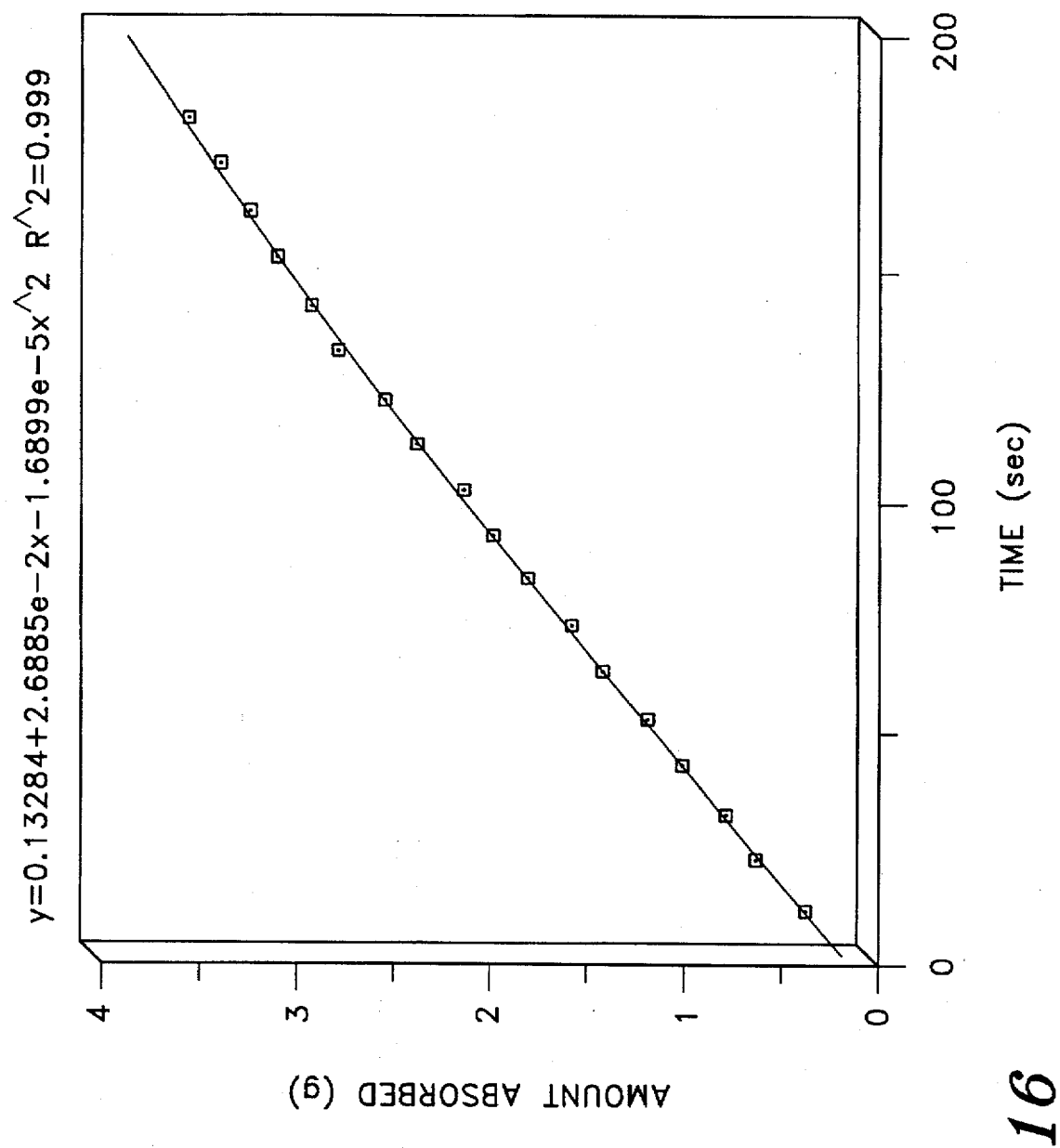
Figure 17:
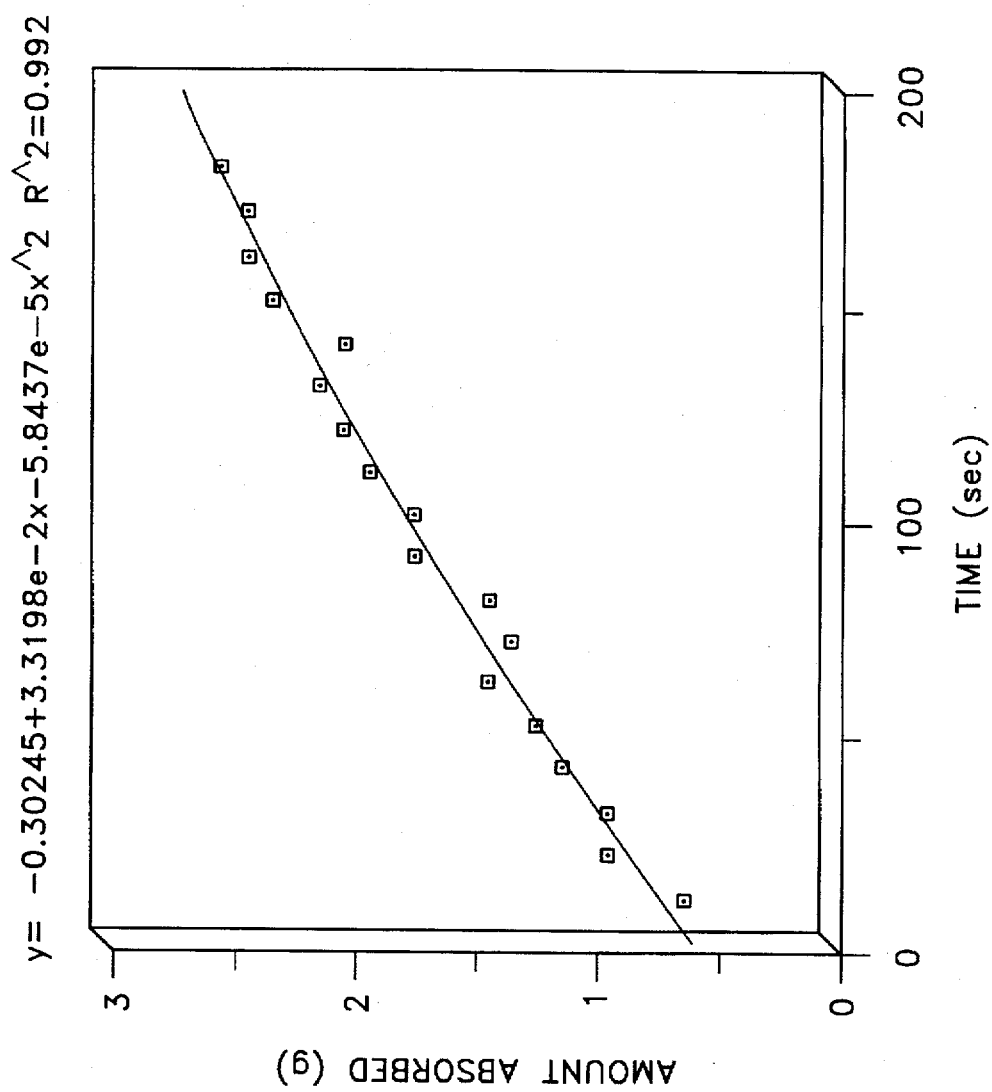
Figure 18:
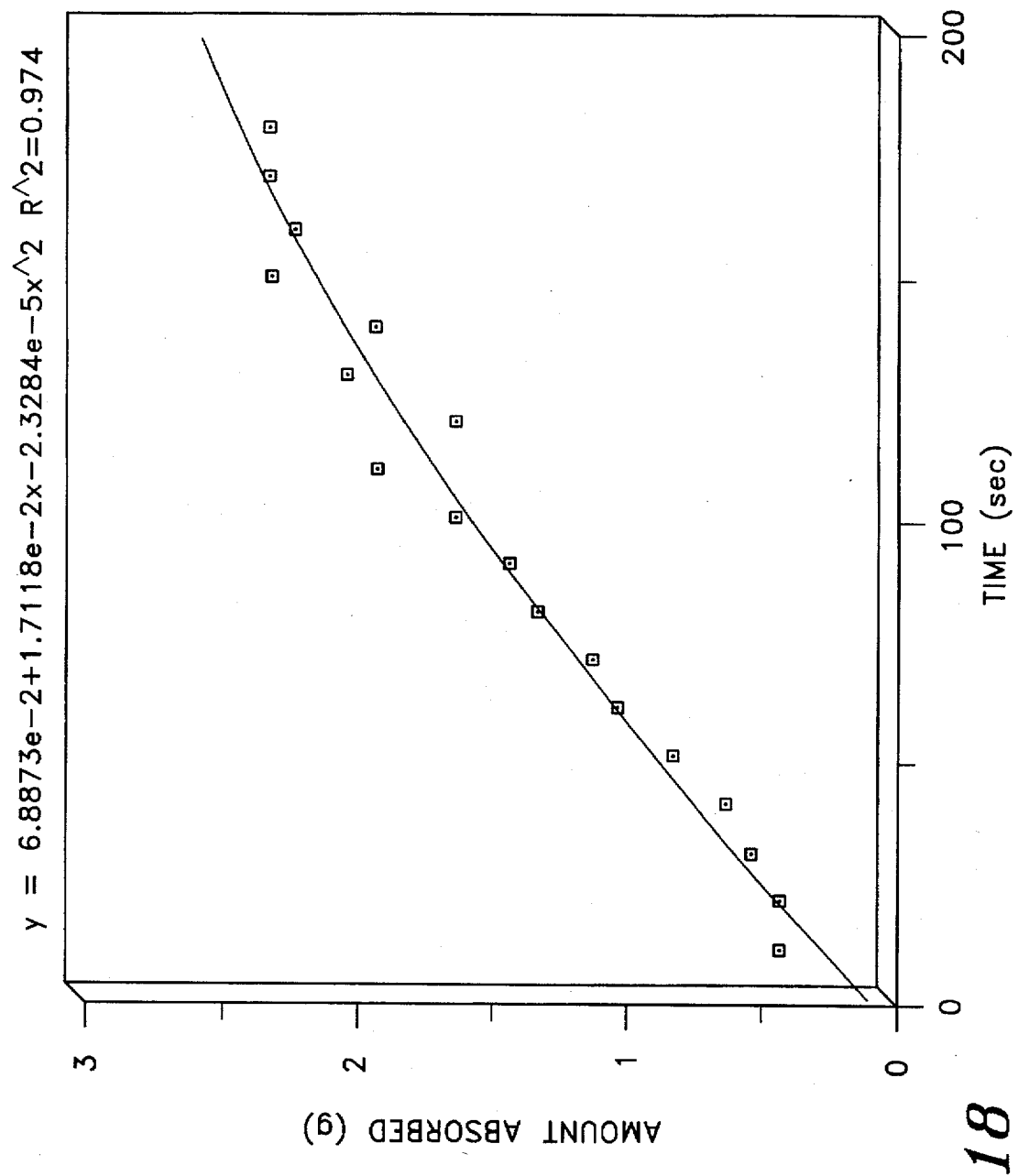
Figure 19:
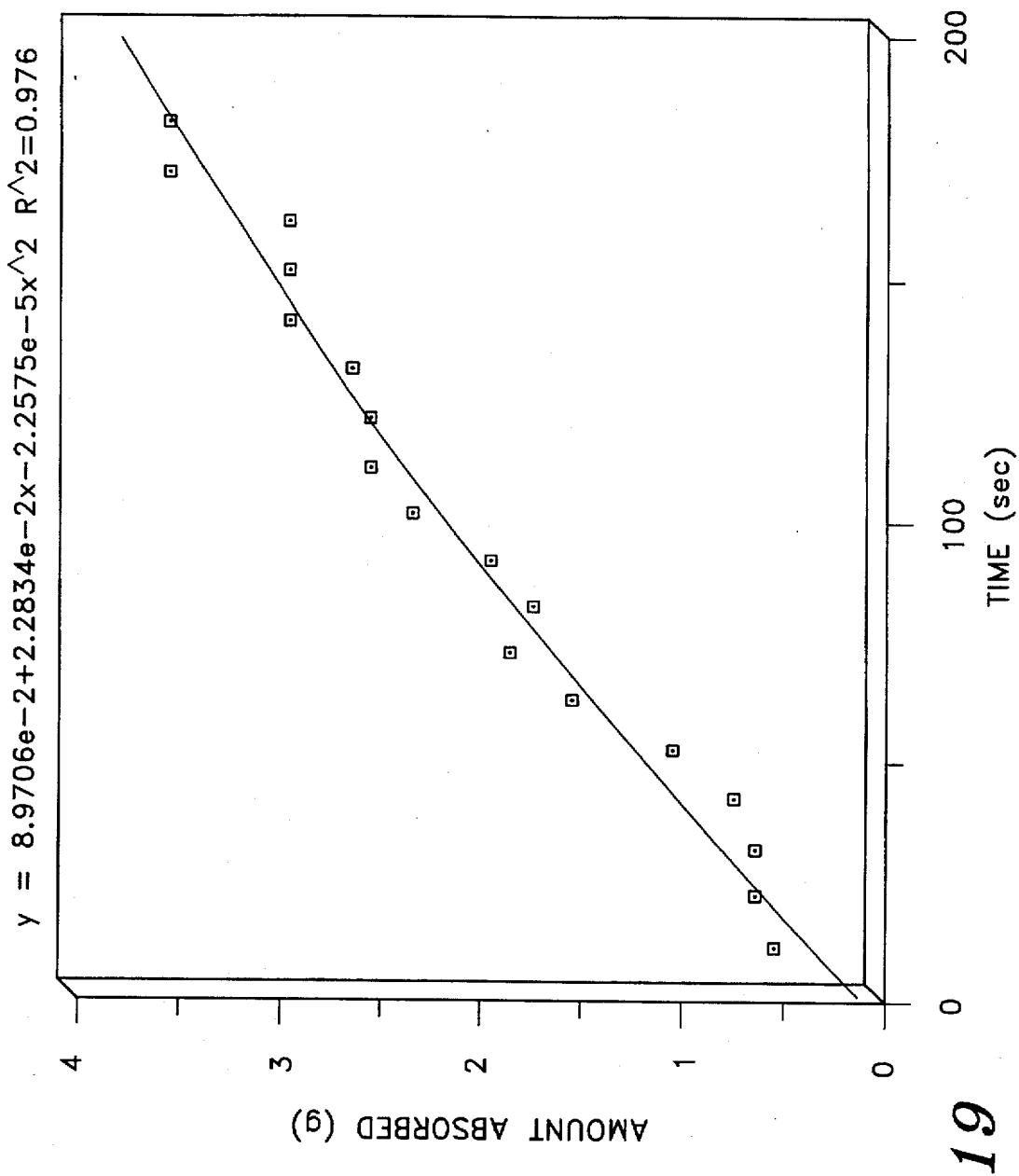
Figure 20:
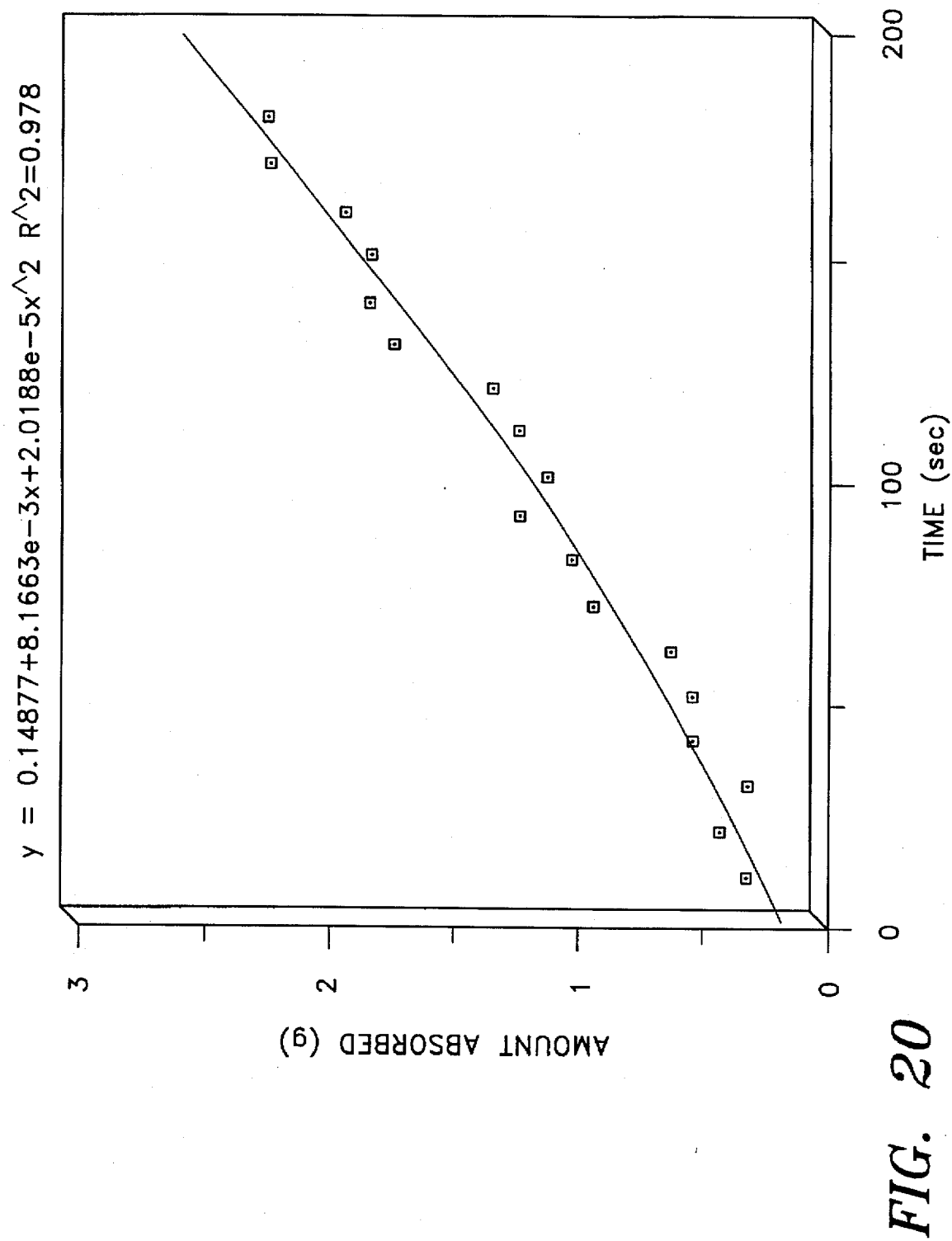
Figure 21:
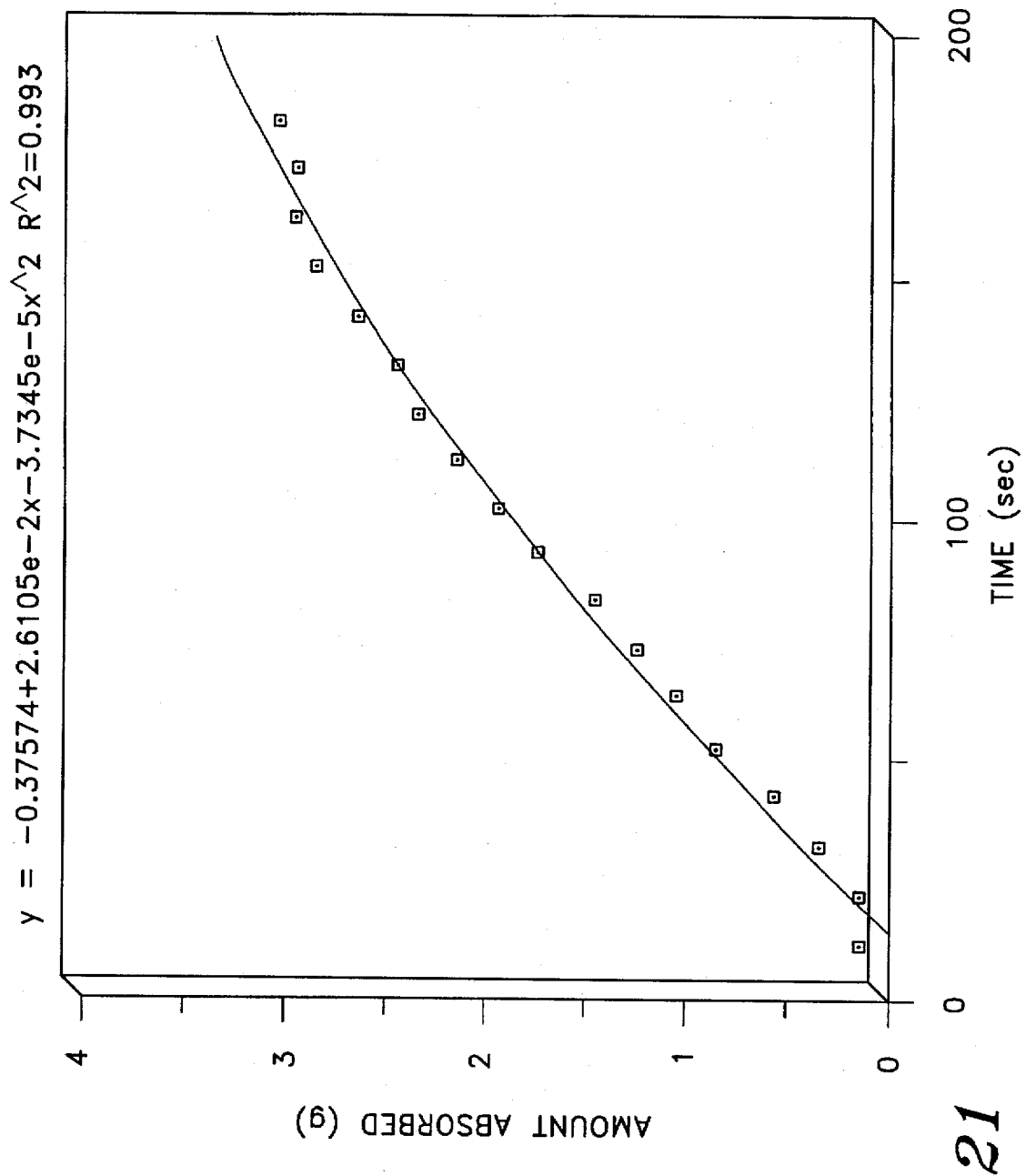
Figure 22:
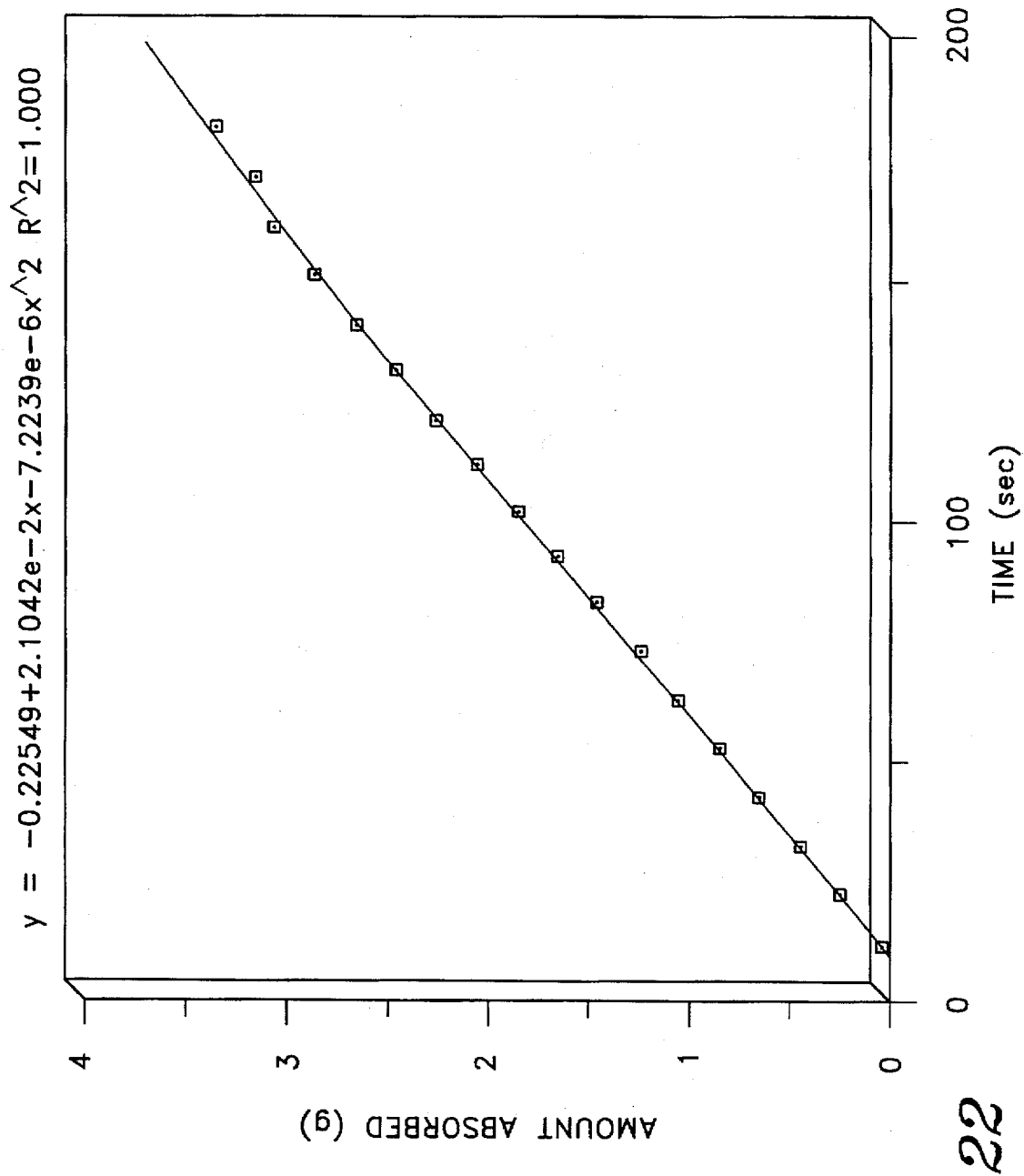
Figure 23:
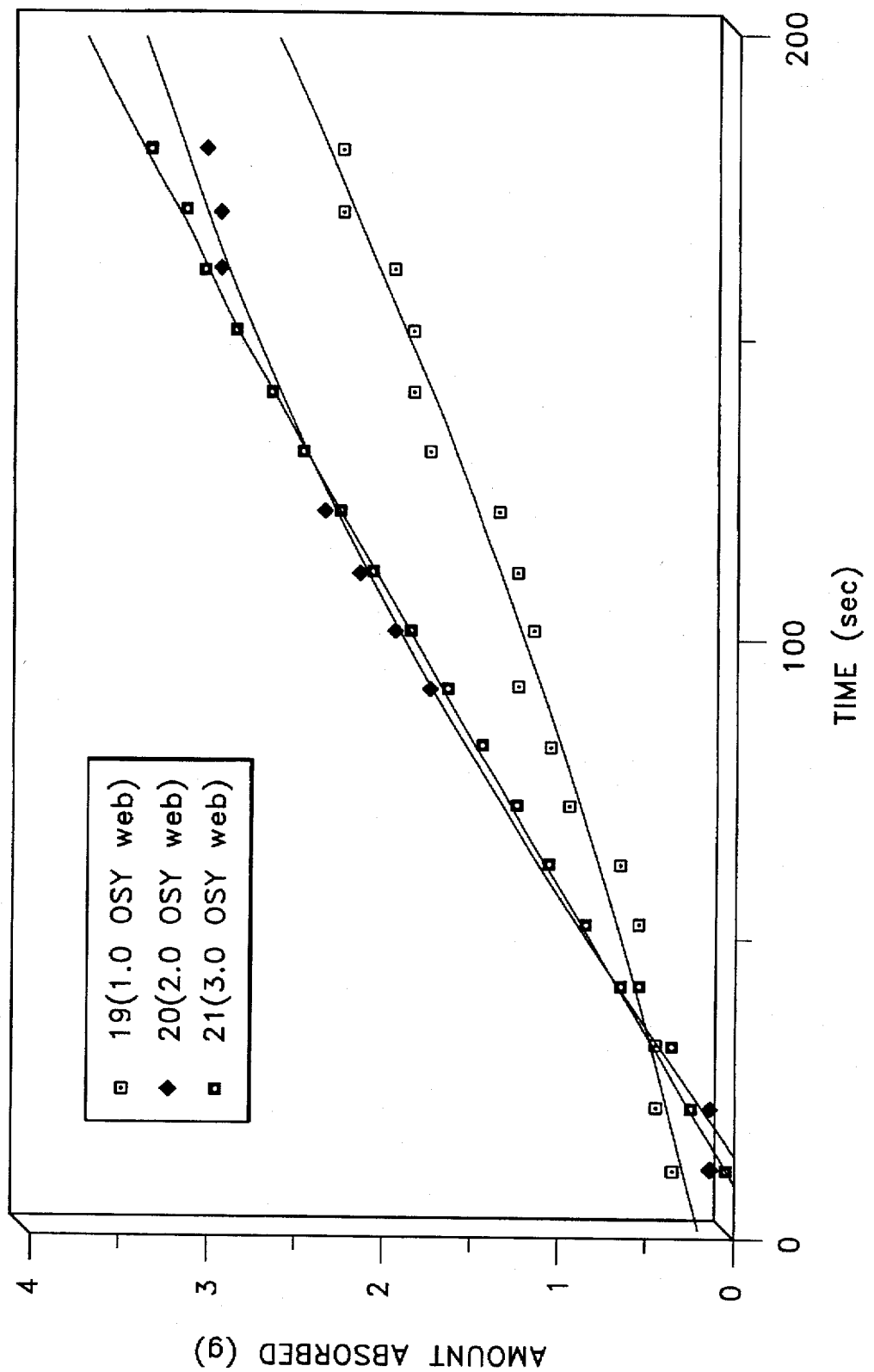
Figure 24:
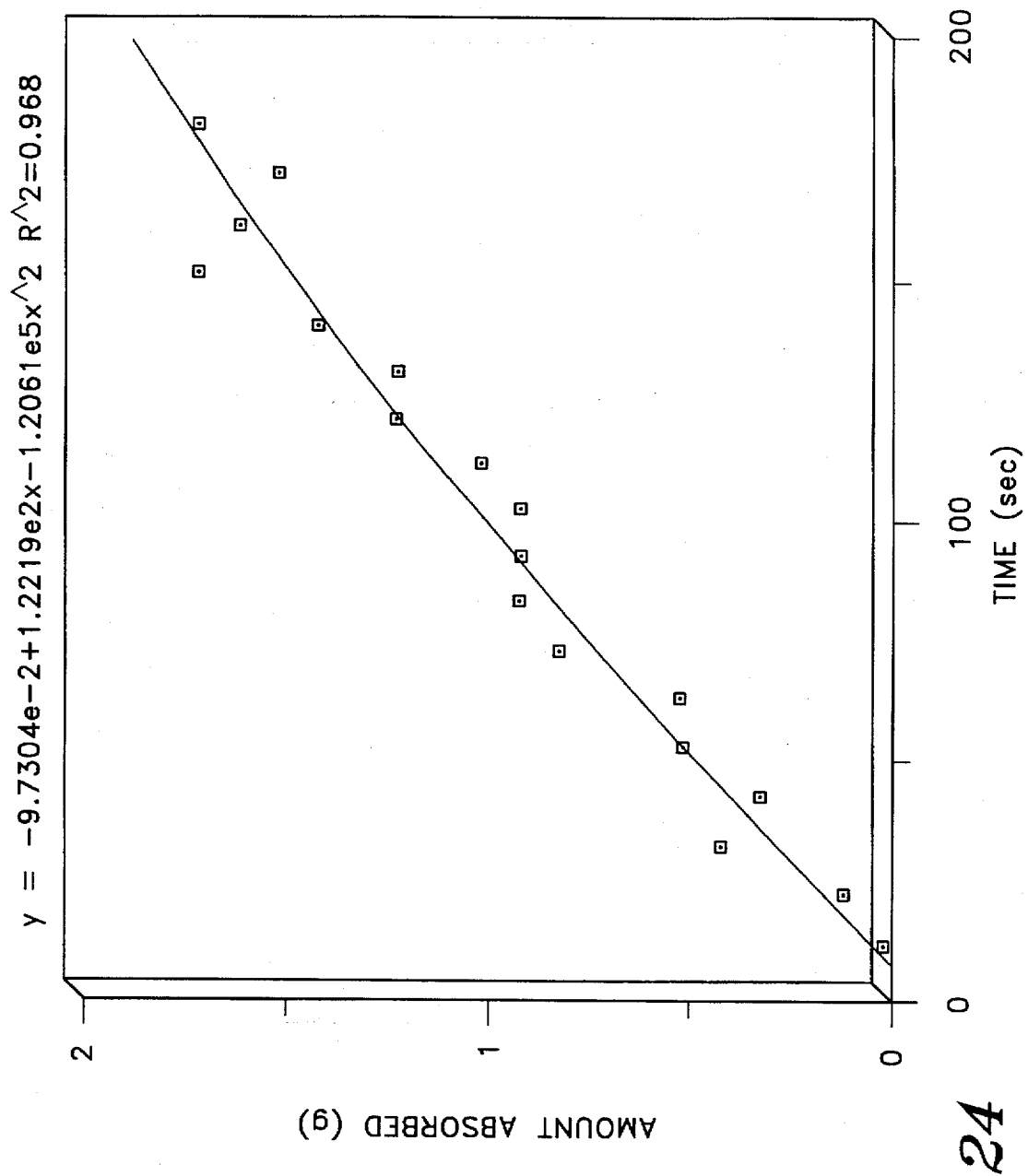
Figure 25:
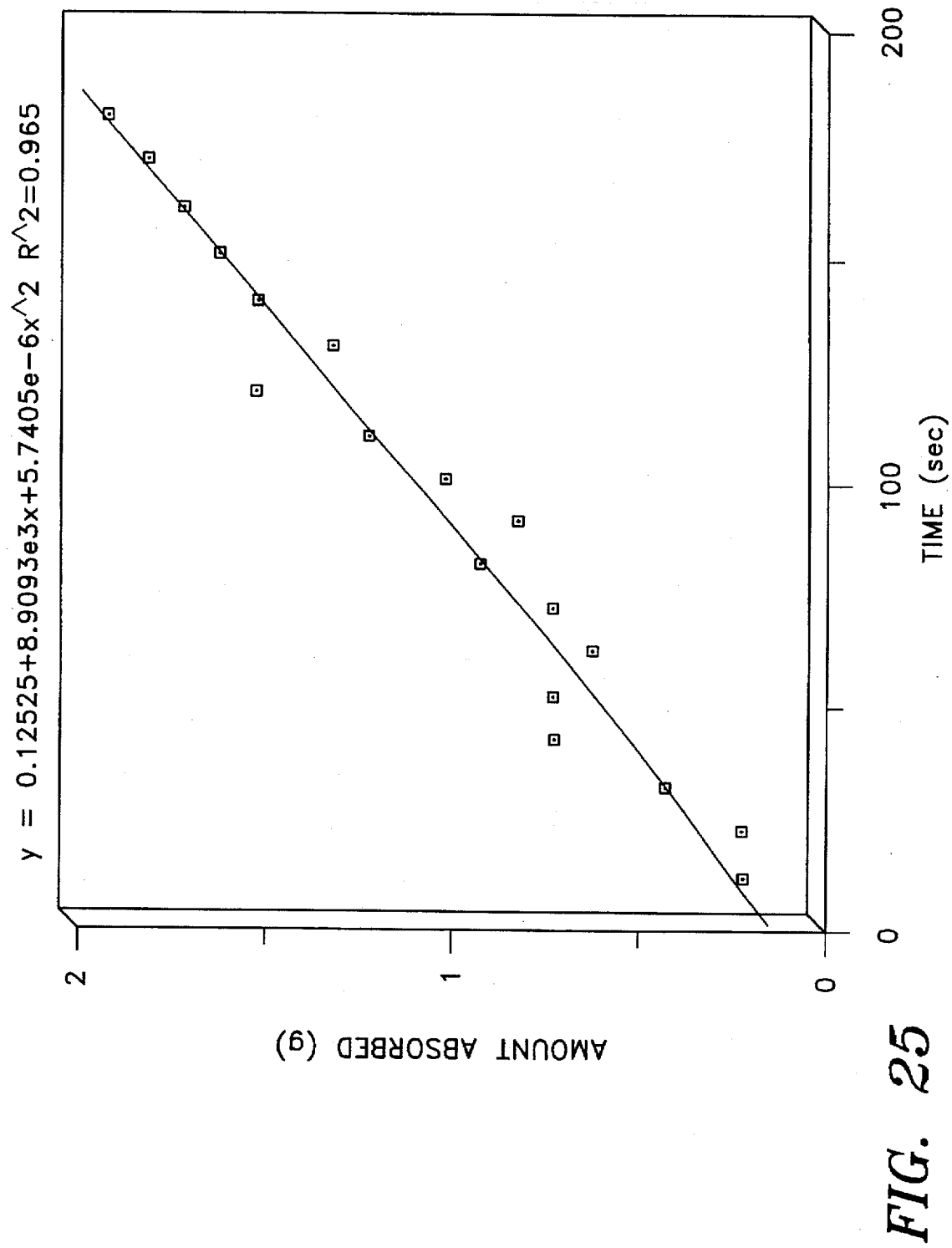
Figure 26:
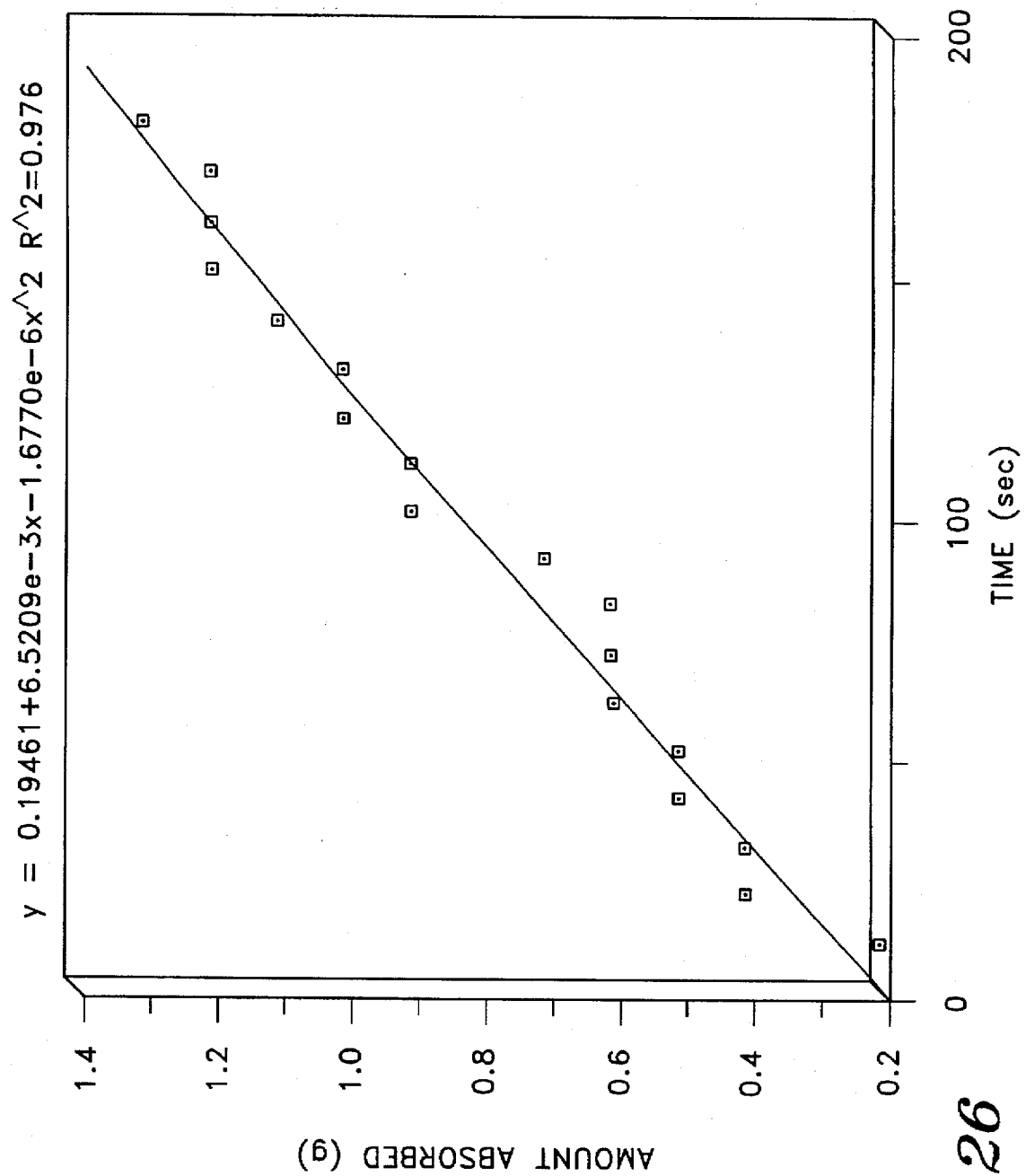
Figure 27:
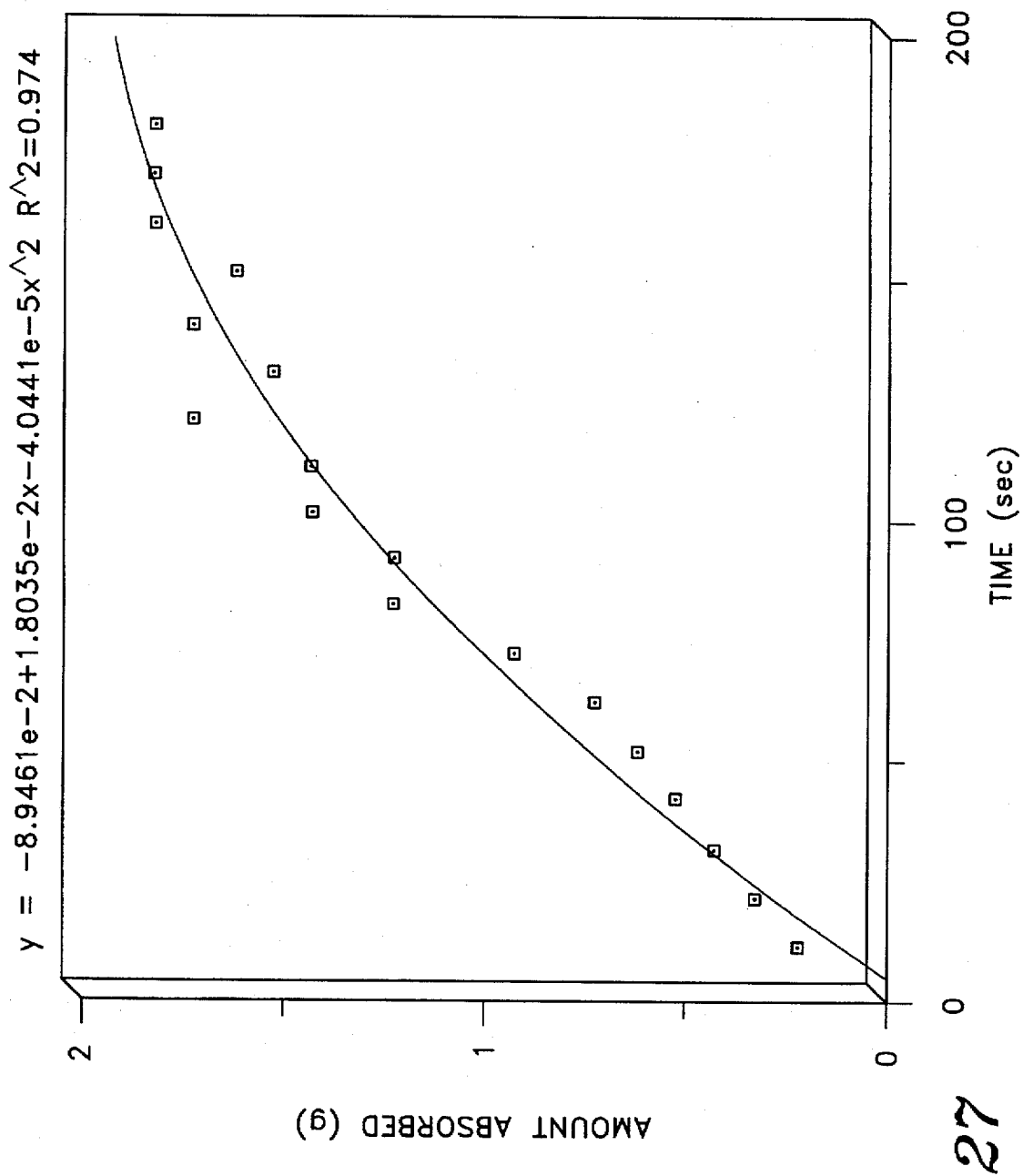
Figure 28:
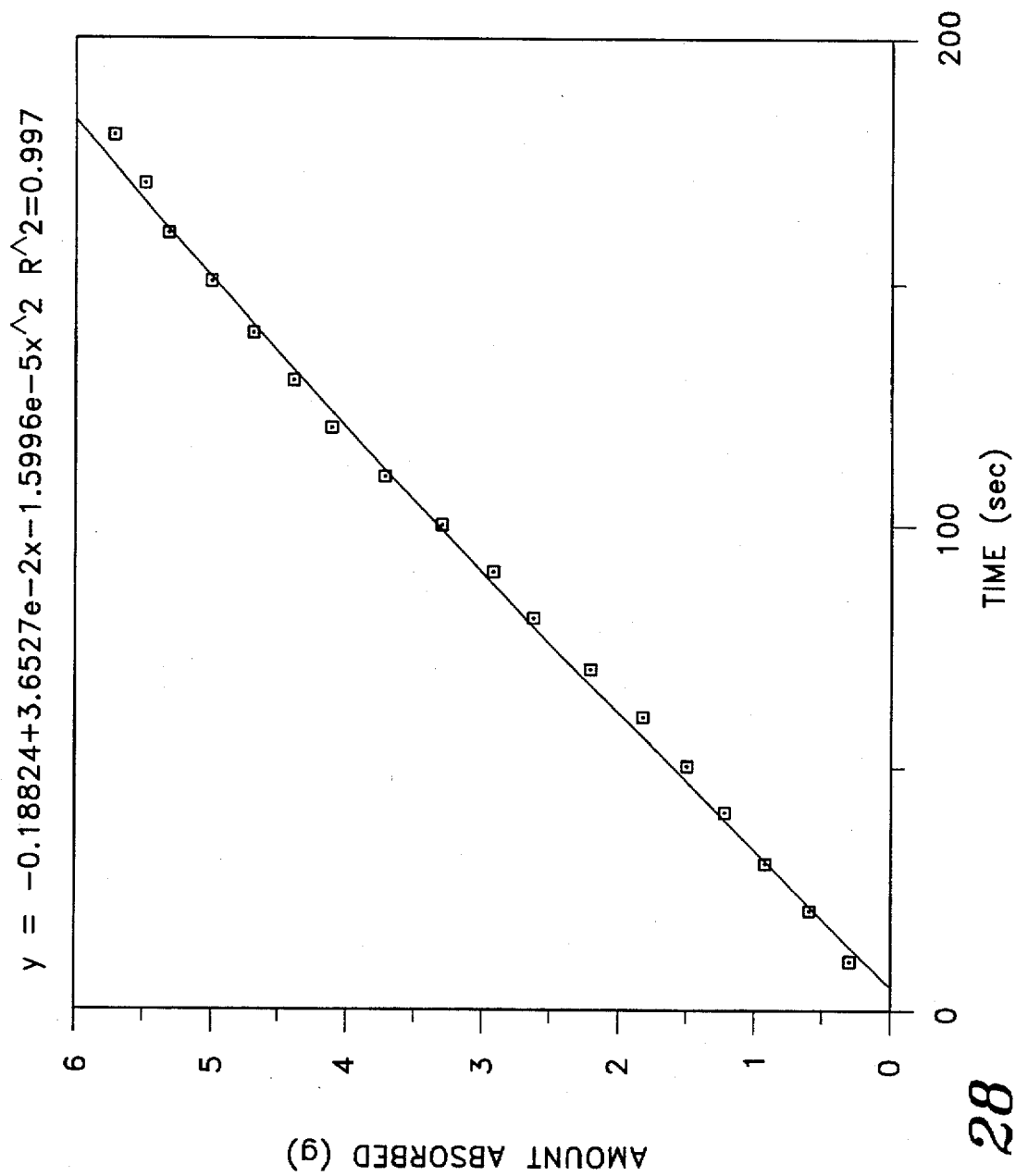
Figure 29:
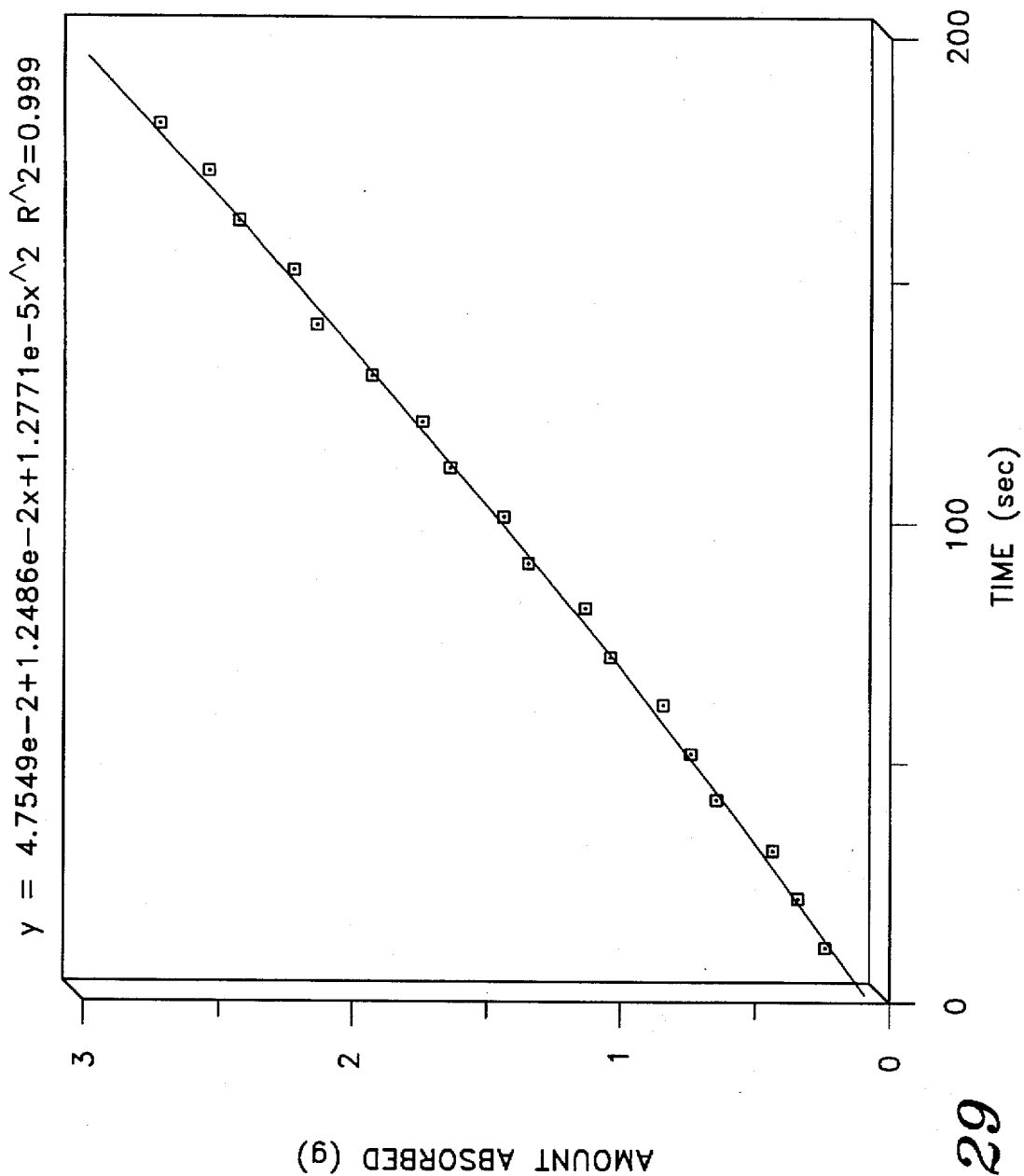
Figure 30:
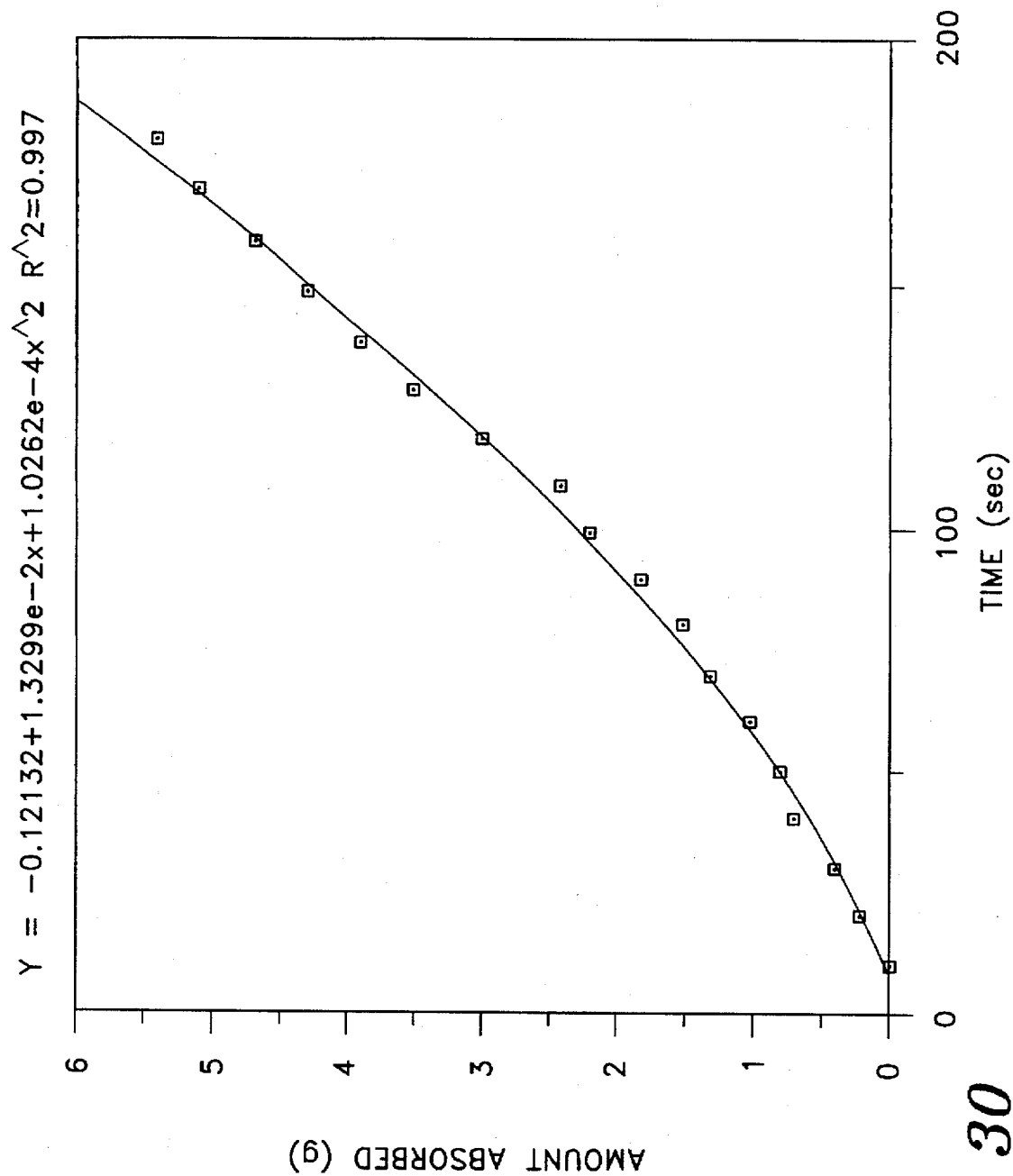
Figure 31:
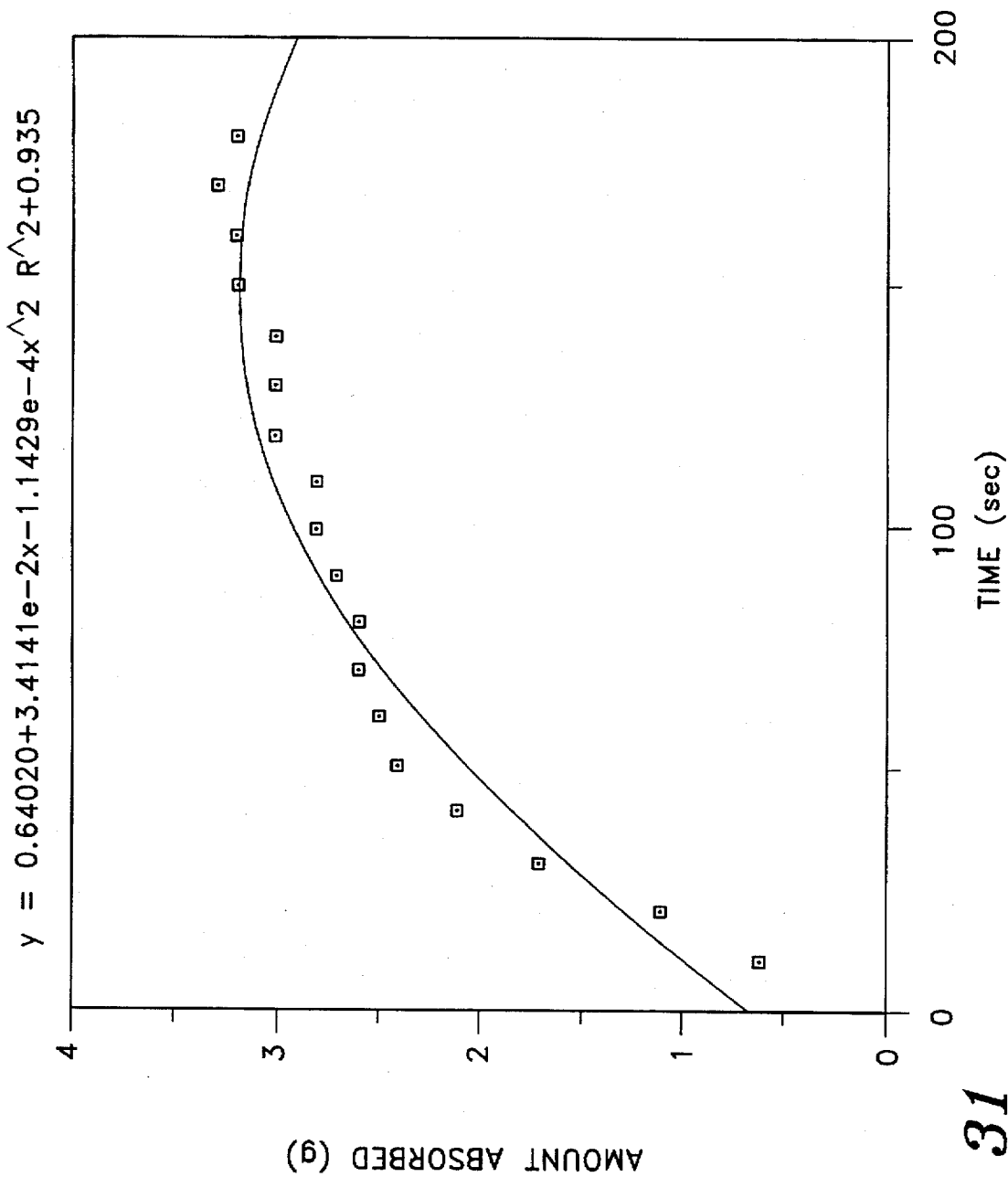
Figure 32:
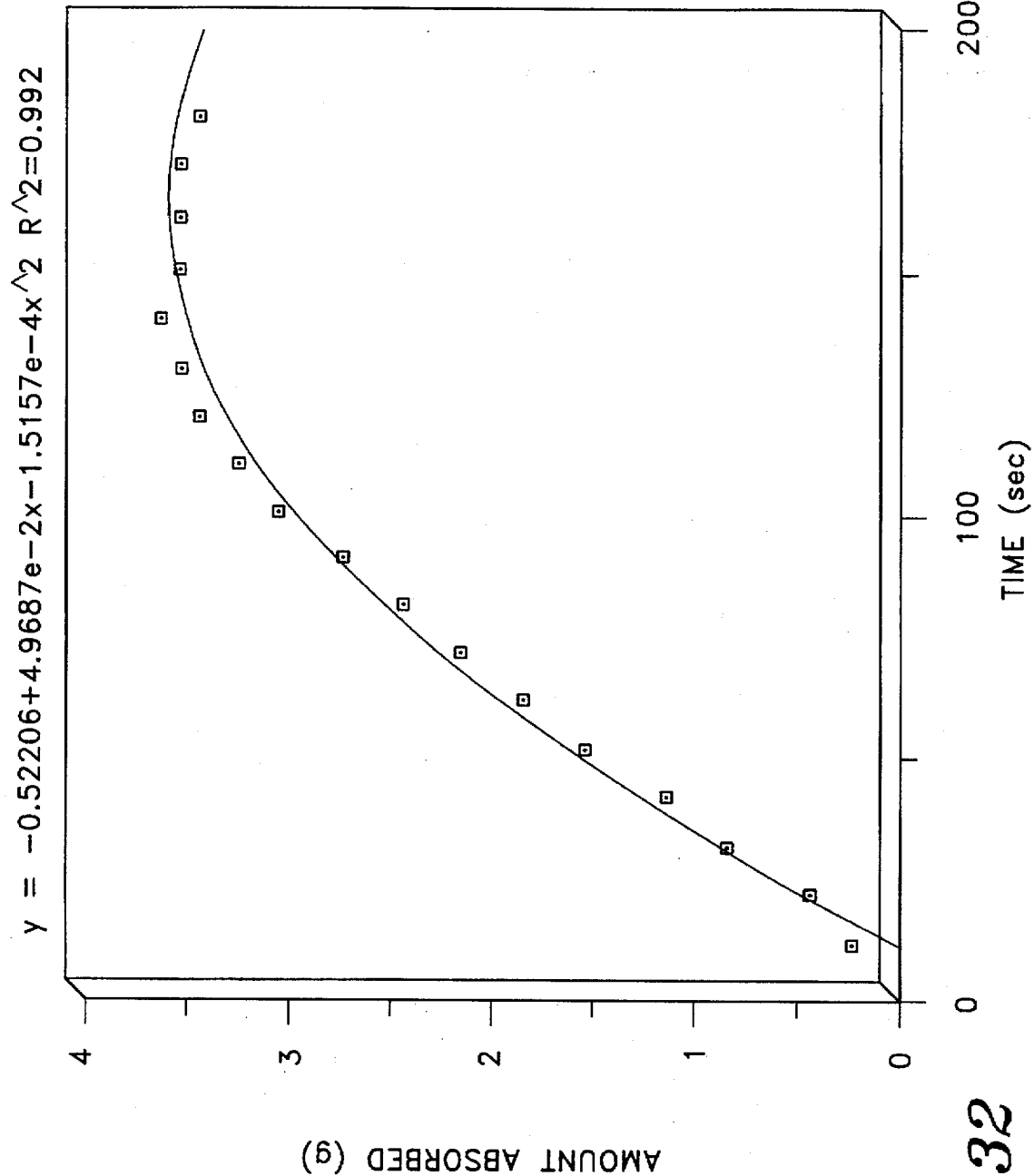
Figure 33:
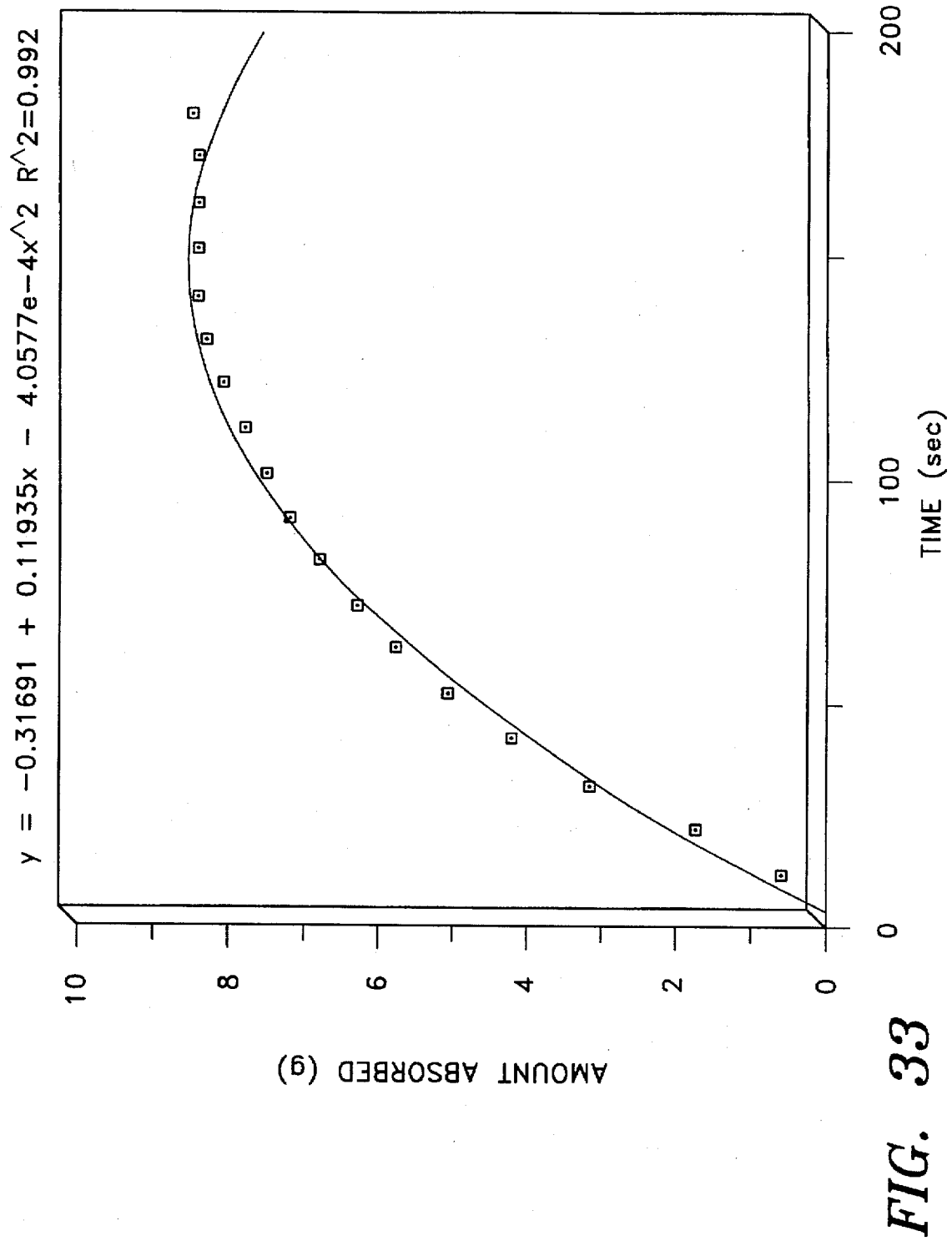
Figure 34:
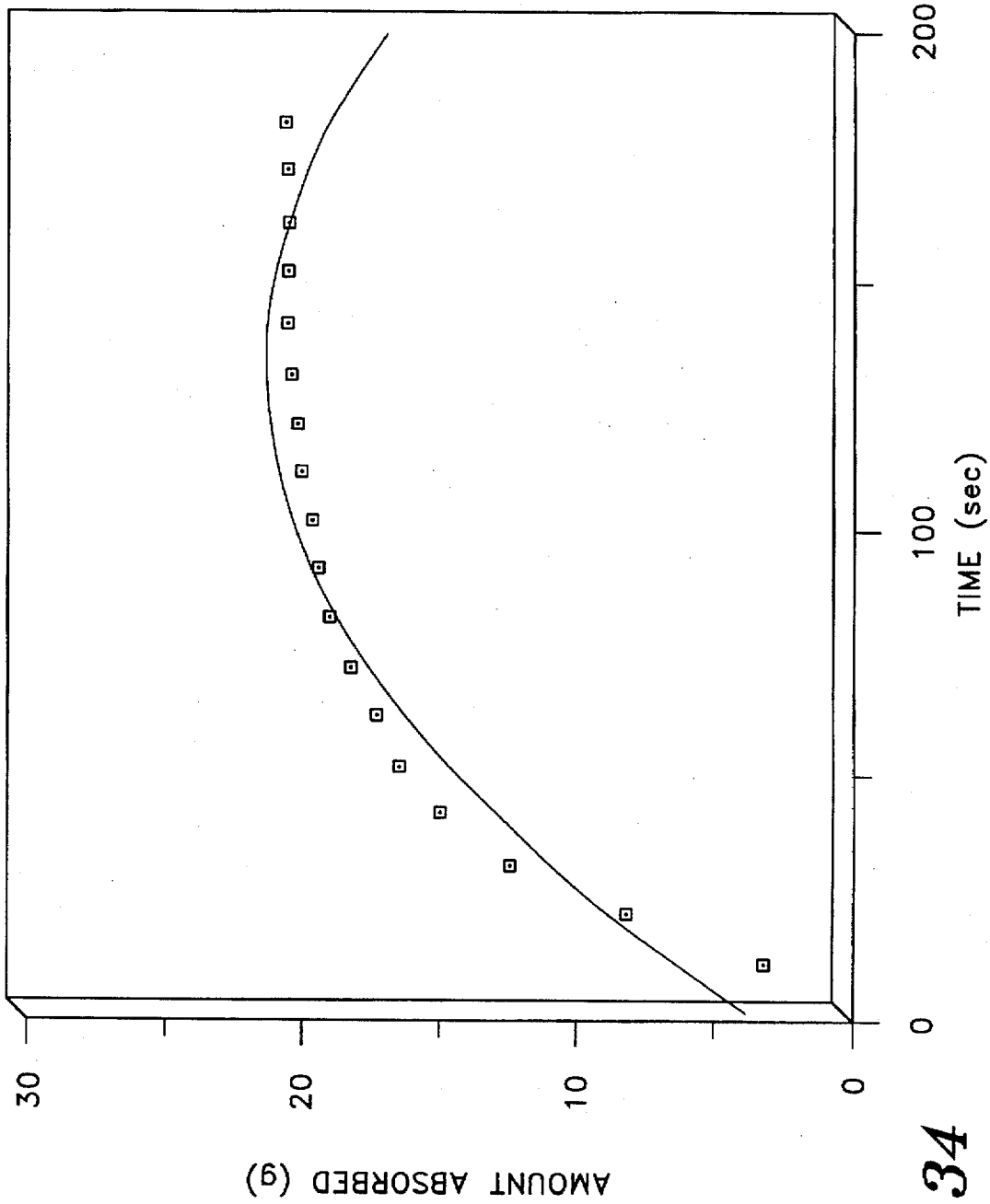
Figure 35:
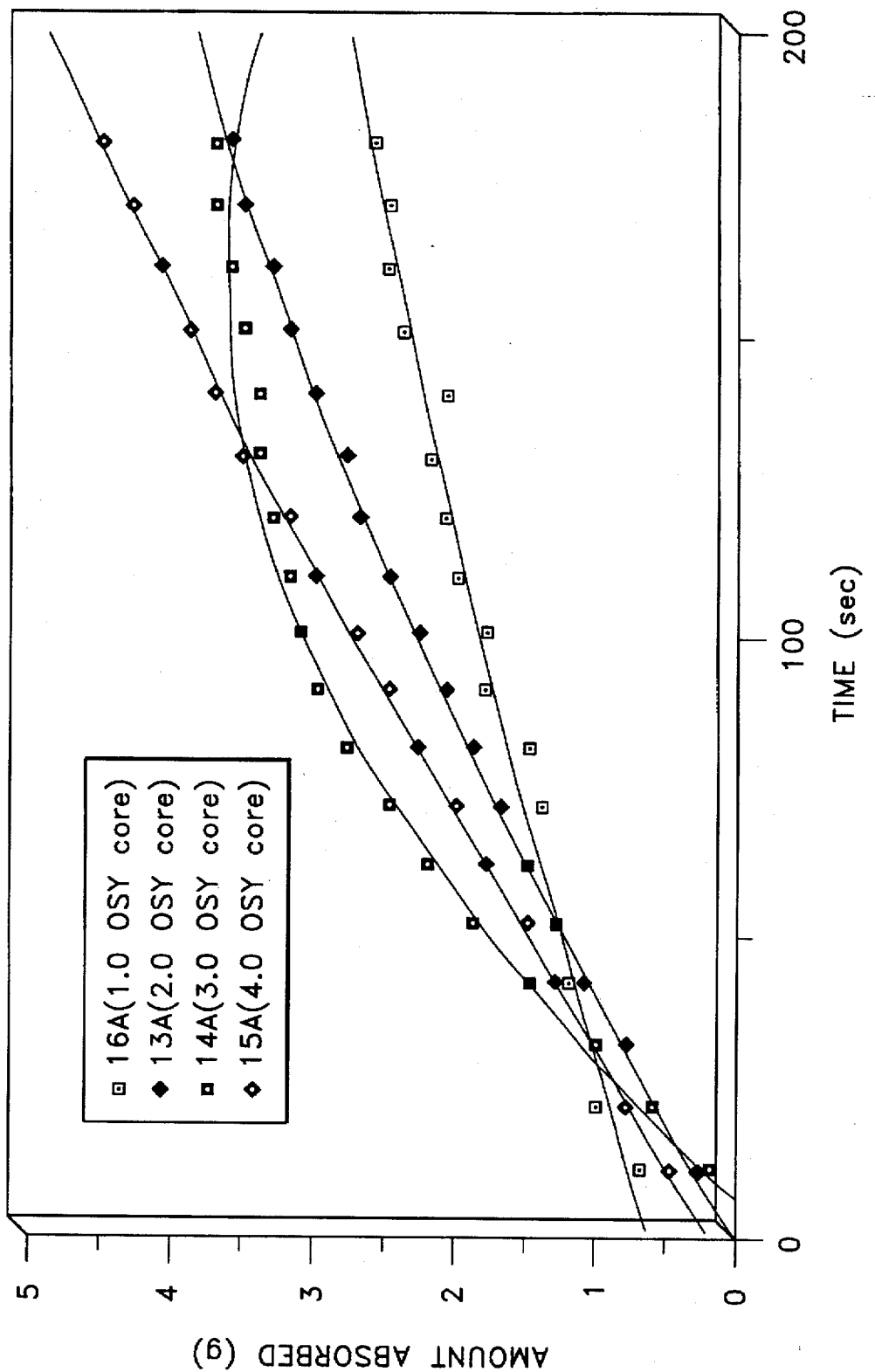
FIG. 35 is a graph depicting the wicking response of laminates in accordance with the present invention and having various cotton core weights.
Figure 36:
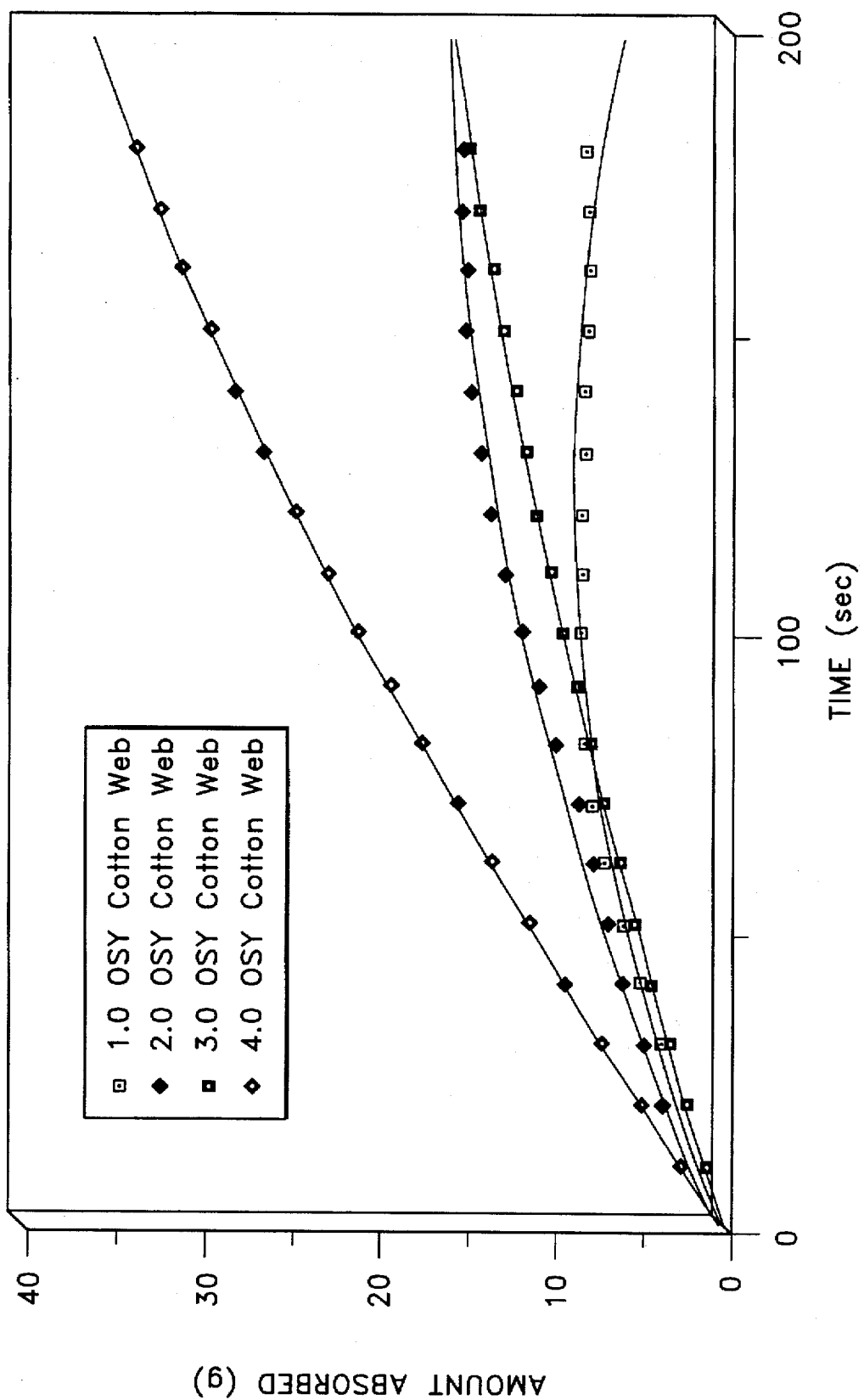
FIG. 36 is a graph depicting the wicking response of nonlaminated cotton webs.
Figure 37:
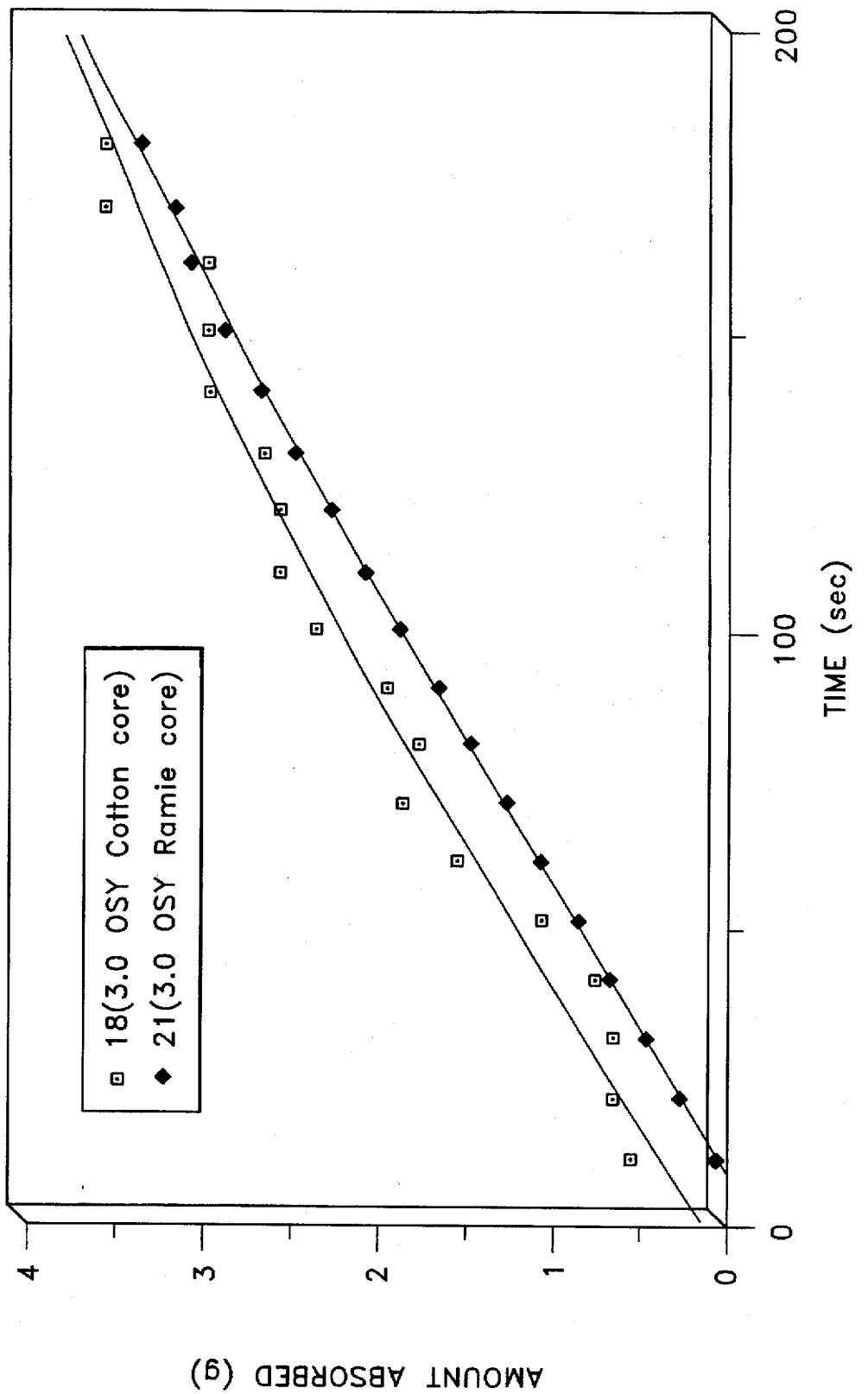
FIG. 37 is a graph comparing the wicking response for laminates having a cotton core with a laminate having a ramie core.

Wicking of the samples was tested employing equipment setup as shown in FIG. 7. This equipment included a toploading balance 90 with attached printer 92; laboratory jack 94; water reservoir 95 to hold test liquid 96; funnel 98 with coarse (40–60 micron) glass frit 100; rubber tubing 102 to connect funnel 98 to water reservoir 95; 100 g circular weight 106 (area, 100 cm$^2$); and a stopwatch (not shown). The funnel 98 is vertically adjustably mounted on a ring stand 110. One hundred cm$^2$ circular samples 108 are cut randomly from a sheet that had been conditioned at 20° C. and 65% relative humidity overnight. Seven samples are cut from each sheet to be tested. Procedurally, the test liquid reservoir was raised until the surface of the glass frit was moist (but water was not standing on it). The specimen was placed on the frit with the 100 g circular weight on top. A stopwatch was started with the placement of the weight on the sample and a reading of the weight of test liquid lost from the reservoir to the sample was taken every 10 seconds over an interval of 3 minutes. This provided sufficient time to allow the amount of liquid wicked into the sample to stabilize. The result was plotted on a time versus amount curve. This procedure was replicated seven times for each sheet evaluated. Identification of the several samples is given in Table X. The time vs. amount curves which resulted from the testing of these samples are presented in FIGS. 8 through 34.

Most notably, observation of FIGS. 8–34 reveals that the wicking characteristic of the prior art laminates comprising man-made fibers or filaments display very poor wicking. On the other hand, when these same fabrics are laminated with a layer of natural cellulosic fibers, the resultant fabric exhibits excellent wicking properties, thereby providing the desired fabric for medical and other applications.

Whereas the invention has been described by way of specific examples, it is intended that the invention include various modifications as will be recognized by one skilled in the art. For example, various bonding patterns, other than the diamond pattern which is described may be employed. Further, various fluorochemical finishes are commercially available and well known in the industry, e.g., see the *Handbook of Fiber Science and Technology: Volume II. Chemical Processing of Fibers and Fabrics, Functional Finishes, Part B*, edited by Menachem Lewin and Stephen B. Sello, incorporated herein by reference, and particularly pp. 172–183.

We claim:

1. A multi layered nonwoven laminate web having improved wicking, liquid absorption and retention properties, comprising a first and third layers which each comprise fibrous nonwoven material selected from the group consisting of thermoplastic meltblown man-made fibers, thermoplastic spunbonded man-made fibers, and combinations thereof, said first and third layers having a weight of between about 0.05 and about 10 oz/yd$^2$, and a second layer sandwiched between the first and third layers which comprises non-wood cellulose-based staple fibers, said second layer having a weight of between about 0.1 and about 10 oz/yd$^2$, the fibers of said second layer having a fiber length of between about 0.5 and about 3 inches and a fineness equivalent to between about 2 and about 5 Micronaire units, the layers being thermally bonded at spaced apart bonding areas to form a coherent web having an air permeability of between about 25 and 37 ft$^3$/min/ft$^2$ and a weight of between about 0.5 and about 24 oz/yd$^2$, the area of bonding between the layers being between about 5 and about 75% of the area of the laminate web.

2. The laminate web of claim 1 wherein said layers are bonded together at spaced locations over the flat area of said web in a pattern of substantially equally spaced apart areas.

3. The laminate web of claim 1 wherein each of said first and third layers exhibits a void volume in excess of about 85%.

4. The laminate web of claim 1 wherein said laminate web exhibits a wicking rate of water of between about 0.01 g/sec. and about 0.05 g/sec., and a water retention value at 3 kPa of between about 7 and about 15.

5. The laminate web of claim 1 wherein said laminate web has a bursting strength of between about 40 and about 225 kPa.

6. The laminate web of claim 1 wherein the fibers of said second layer are buckled along their lengths, and are randomly oriented such that they are in no major orientation and such that fiber ends extend laterally off the plane of said second layer into and through said first and third layers.

7. The laminate web of claim 6 wherein said laminate web exhibits a wicking rate of water of at least about 0.01 g/sec and a water retention value at 3 kPa of at least about 7 ml.

8. The laminate web of claim 1 wherein the fiber of said second layer comprises cotton fibers having a fiber length of between about 0.5 and about 1.25 inches and a fineness equivalent to between about 3 and about 5 Micronaire units.

9. The laminate web of claim 1 wherein said first layer has a weight of between about 0.25 and about 2.0 oz/yd².

10. The laminate web of claim 1 wherein said second layer has a weight of between about 1 and about 4 oz/yd².

11. The laminate web of claim 1 wherein said third layer has a weight of between about 0.25 and about 2.0 oz/yd².

12. The laminate web of claim 1 wherein the area of bonding between the layers is between about 10 and about 30% of the area of the laminate web.

13. The laminate web of claim 1 wherein said first layer is a meltblown web.

14. The laminate web of claim 1 wherein said first layer is a spunbonded web.

15. The laminate web of claim 1 wherein said first and third layers are meltblown webs.

16. The laminate web of claim 1 wherein said first and third layers are spunbonded webs.

17. The laminate web of claim 1 wherein said first layer is a meltblown web and said third layer is a spunbonded web.

18. The laminate web of claim 1 wherein said thermoplastic man-made fibers are polypropylene fibers.

19. The multilayered nonwoven laminate of claim 1 wherein the second layer of staple fibers comprises about 25% to 100% cellulosic material.

20. The multilayered nonwoven laminate of claim 19 wherein the cellulosic material is cotton.

21. The multilayered nonwoven laminate of claim 1 wherein the second layer of staple fibers comprises about 25% to 100% cellulosic material selected from the group consisting of cotton, ramie, hemp, jute, flax, kenaf, bagasse, eucalyptus, rayon and combinations thereof.

22. The multilayered nonwoven laminate of claim 21 wherein the cellulosic material is selected from the group consisting of cotton, rayon and ramie.

23. The multilayered nonwoven laminate of claim 1 wherein the man-made fibers contain short cellulosic fibers.

24. A thermally bonded multilayered nonwoven laminate web having improved wicking and liquid absorption and retention properties, comprising first and third layers which each comprise thermoplastic melt-blown man-made fibers, said first and third layers each having a weight of between about 0.05 and about 10 oz/yd², and a second layer sandwiched between the first and third layers which comprises non-wood cellulose-based staple fibers, said second layer having a weight of between about 0.1 and about 10 oz/yd², the fibers of said second layer having a fiber length of between about 0.5 and about 3 inches and a fineness equivalent to between about 2 and about 5 Micronaire units, the layers being thermally bonded at spaced apart bonding areas to form a coherent web having a an air permeability of between about 25 and 37 ft³/min/ft² and a weight of between about 0.5 and about 24 oz/yd², the area of bonding between the layers being between about 5 and about 75% of the area of the laminate web.

25. The multilayered nonwoven laminate web of claim 24 wherein the man-made fibers contain short cellulosic fibers.

26. The laminate web of claim 24 wherein the fibers of said second layer are buckled along their lengths, and are randomly oriented such that they are in no major orientation and such that fiber ends extend laterally off the plane of said second layer into and through said first and third layers.

27. The laminate web of claim 24 wherein the fiber of said second layer comprises cotton fibers having a fiber length of between about 0.5 and about 1.25 inches and a fineness equivalent to between about 3 and about 5 Micronaire units.

28. The laminate web of claim 24 wherein said first and third layers each has a weight of between about 0.25 and about 2.0 oz/yd².

29. The laminate web of claim 24 wherein said second layer has a weight of between about 1 and about 4 oz/yd².

30. The laminate web of claim 24 wherein the area of bonding between the layers is between about 10 and about 30% of the area of the laminate web.

31. The laminate web of claim 24 wherein said thermoplastic man-made fibers are polypropylene fibers.

32. The multilayered nonwoven laminate web of claim 24 wherein the second layer of staple fibers comprises about 25% to 100% cellulosic material.

33. The multilayered nonwoven laminate web of claim 32 wherein the cellulosic material is cotton.

34. The multilayered nonwoven laminate web of claim 1 wherein the bonding is effected from only one side of the laminate.

35. The multilayered nonwoven laminate web of claim 24 wherein the bonding is effected from only one side of the laminate.

36. The multilayered nonwoven laminate web of claim 1 wherein the bonding of the layers extends over substantially the entire area of the laminate.

37. The multilayered nonwoven laminate fabric of claim 1 wherein the laminate comprises at least one additional layer selected from the group consisting of meltblown man-made fibers, spunbonded man-made fibers and cellulosic-based staple fibers.

38. A thermally bonded multilayered nonwoven laminate web having improved wicking and liquid absorption and retention properties, comprising first and third layers which each comprise thermoplastic spunbonded man-made fibers, said first and third layers each having a weight of between about 0.05 and about 10 oz/yd², and a second layer sandwiched between the first and third layers which comprises non-wood cellulose-based staple fibers, said second layer having a weight of between about 0.1 and about 10 oz/yd², the fibers of said second layer having a fiber length of between about 0.5 and about 3 inches and a fineness equivalent to between about 2 and about 5 Micronaire units, the layers being thermally bonded at spaced apart bonding areas to form a coherent web having a weight of between about 0.5 and about 24 oz/yd², the area of bonding between the layers being between about 5 and about 75% of the area of the laminate web.

39. The laminate web of claim 37 in which the additional layer is positioned between the first and second layers.

40. A multilayered nonwoven laminate web having improved wicking, liquid absorption and retention properties, comprising a first and third layers which each comprise fibrous nonwoven material selected from the group consisting of thermoplastic meltblown man-made fibers, thermoplastic spunbonded man-made fibers, and combinations thereof, said first and third layers having a weight of between about 0.05 and about 10 oz/yd², and a second layer sandwiched between the first and third layers which comprises non-wood cellulose-based staple fibers, said second layer having a weight of between about 0.1 and about 10 oz/yd$^2$, the fibers of said second layer having a fiber length of between about 0.5 and about 3 inches and a fineness equivalent to between about 2 and about 5 Micronaire units, the layers being thermally bonded at spaced apart bonding areas to form a coherent web having a weight of between about 0.5 and about 24 oz/yd$^2$, the area of bonding between the layers being between about 5 and about 75% of the area of the laminate web.

41. The laminate web of claim 40 wherein said first layer is a meltblown web.

42. The laminate web of claim 40 wherein said first layer is a spunbonded web.

43. The laminate web of claim 40 wherein said first and third layers are meltblown webs.

44. The laminate web of claim 40 wherein said first and third layers are spunbonded webs.

45. The laminate web of claim 40 wherein said first layer is a meltblown web and said third layer is a spunbonded web.

46. The laminate web of claim 40 wherein said thermoplastic man-made fibers are polypropylene fibers.

47. The multilayered nonwoven laminate of claim 40 wherein the second layer of staple fibers comprises about 25% to 100% cellulosic material.

48. The multilayered nonwoven laminate of claim 47 wherein the cellulosic material is cotton.

49. The multilayered nonwoven laminate of claim 40 wherein the second layer of staple fibers comprises about 25% to 100% cellulosic material selected from the group consisting of cotton, ramie, hemp, jute, flax, kenaf, bagasse, eucalyptus, rayon and combinations thereof.

50. The laminate web of claim 6 wherein the fiber of said second layer comprises cotton fibers having a fiber length of between about 0.5 and about 1.25 inches and a fineness equivalent to between about 3 and about 5 Micronaire units.

* * * * *

UNITED STATES PATENT AND TRADEMARK OFFICE
CERTIFICATE OF CORRECTION

PATENT NO.   : 5,683,794
DATED        : November 4, 1997
INVENTOR(S)  : Wadsworth and Duckett It is certified that error appears in the above-indentified patent and that said Letters Patent is hereby corrected as shown below:

On the cover page, item 73, line 1 change "university" to --University--.

On the cover page, item 75, line 3 change "Venkataramanan" to --Venkataraman--.

Signed and Sealed this

Seventh Day of July, 1998

Attest:

BRUCE LEHMAN

*Attesting Officer*      *Commissioner of Patents and Trademarks*